US011128169B2

(12) United States Patent
Kim et al.

(10) Patent No.: US 11,128,169 B2
(45) Date of Patent: Sep. 21, 2021

(54) ELECTRONIC DEVICE INCLUDING A PLURALITY OF WIRELESS CHARGE COILS AND OPERATING METHOD THEREOF

(71) Applicant: Samsung Electronics Co., Ltd., Suwon-si (KR)

(72) Inventors: Kwangseob Kim, Suwon-si (KR); Keumsu Song, Suwon-si (KR); Changhak O, Suwon-si (KR); Dongzo Kim, Suwon-si (KR); Jihye Kim, Suwon-si (KR); Mincheol Ha, Suwon-si (KR); Kihyun Kim, Suwon-si (KR); Jiwon Kim, Suwon-si (KR); Yunjeong Noh, Suwon-si (KR); Kyungmin Lee, Suwon-si (KR); Hyungkoo Chung, Suwon-si (KR); Jongchul Hong, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/447,113

(22) Filed: Jun. 20, 2019

(65) Prior Publication Data

US 2020/0036227 A1     Jan. 30, 2020

(30) Foreign Application Priority Data

Jul. 30, 2018   (KR) .................. 10-2018-0088859

(51) Int. Cl.
*H02J 7/00*    (2006.01)
*H02J 50/10*   (2016.01)
(Continued)

(52) U.S. Cl.
CPC ............ *H02J 50/10* (2016.02); *H01F 27/288* (2013.01); *H01F 27/30* (2013.01)

(58) Field of Classification Search
CPC ........ H01F 27/288; H01F 38/14; H01F 27/30; H02J 50/10; H02J 50/402; H02J 50/80; H02J 50/005
See application file for complete search history.

(56) References Cited

U.S. PATENT DOCUMENTS 9,960,628 B2    5/2018   Peralta et al.
2007/0279002 A1*  12/2007  Partovi .............. G06K 19/0704
                                               320/115
(Continued)

FOREIGN PATENT DOCUMENTS

EP    2 816 663 A1   12/2014
EP    2 852 025 A1    3/2015
(Continued)

OTHER PUBLICATIONS

International Search Report dated Sep. 26, 2019, issued in an International application No. PCT/KR2019/007461.
(Continued)

*Primary Examiner* — Carlos Amaya
*Assistant Examiner* — Esayas G Yeshaw
(74) *Attorney, Agent, or Firm* — Jefferson IP Law, LLP

(57) ABSTRACT

An electronic device including a wireless charging coils, and an operating method thereof are provided. The electronic device includes a housing including a concave portion couplable to a protrusion of one or more external electronic devices, a first coil stored inside the housing, a second coil stored inside the housing, and disposed between the first coil and the concave portion, a power transmission circuit including a first connecting terminal electrically coupled to the first coil and a second connecting terminal electrically coupled to the second coil, and a control circuit. The control circuit configured to check a data packet received from the external electronic device which is in proximity to the electronic device, control to transmit first designated power (Continued)

to the external electronic device through the first coil wirelessly, and second designated power to the external electronic device through the second coil wirelessly by using the power transmission circuit.

20 Claims, 18 Drawing Sheets

(51) Int. Cl.
*H01F 27/28* (2006.01)
*H01F 27/30* (2006.01)

(56) References Cited

U.S. PATENT DOCUMENTS

| | | | | |
|---|---|---|---|---|
| 2008/0192509 | A1* | 8/2008 | Dhuyvetter | H02M 3/33523 |
| | | | | 363/17 |
| 2010/0284208 | A1* | 11/2010 | Nguyen | H02M 7/4807 |
| | | | | 363/160 |
| 2012/0161538 | A1* | 6/2012 | Kinoshita | H02J 50/12 |
| | | | | 307/104 |
| 2012/0212069 | A1 | 8/2012 | Kawano et al. | |
| 2014/0333253 | A1 | 11/2014 | Suzuki et al. | |
| 2015/0137746 | A1 | 5/2015 | Lee et al. | |
| 2015/0270058 | A1 | 9/2015 | Golko et al. | |
| 2016/0094076 | A1 | 3/2016 | Kasar et al. | |
| 2016/0118836 | A1* | 4/2016 | Waldschmidt | H02J 7/025 |
| | | | | 320/108 |
| 2016/0181009 | A1 | 6/2016 | Vilander | |
| 2016/0276871 | A1* | 9/2016 | Schmitz | H02J 50/10 |
| 2016/0336791 | A1 | 11/2016 | Na et al. | |
| 2017/0040692 | A1* | 2/2017 | Peralta | H02J 50/80 |
| 2017/0155270 | A1* | 6/2017 | Wang | H02J 50/10 |
| 2017/0187238 | A1* | 6/2017 | Chong | H02J 50/50 |
| 2017/0331316 | A1 | 11/2017 | Bushnell et al. | |
| 2018/0069600 | A1 | 3/2018 | Kowalski et al. | |
| 2019/0272943 | A1* | 9/2019 | Leem | H02J 7/02 |
| 2019/0329653 | A1* | 10/2019 | Ueta | B60K 37/02 |
| 2019/0333694 | A1* | 10/2019 | Ueta | B60L 53/34 |

FOREIGN PATENT DOCUMENTS

| | | |
|---|---|---|
| EP | 3 151 366 A1 | 4/2017 |
| EP | 3 185 394 A1 | 6/2017 |
| WO | 2017-161531 A1 | 9/2017 |

OTHER PUBLICATIONS

European Search Report dated Jun. 14, 2021; European Appln No. 19843282.5-1212/3811494 PCT/KR2019007461.

\* cited by examiner

ELECTRONIC DEVICE INCLUDING A PLURALITY OF WIRELESS CHARGE COILS AND OPERATING METHOD THEREOF

CROSS-REFERENCE TO RELATED APPLICATION(S)

This application is based on and claims priority under 35 U.S.C. § 119 of a Korean patent application number 10-2018-0088859, filed on Jul. 30, 2018, in the Korean Intellectual Property Office, the disclosure of which is incorporated by reference herein in its entirety.

BACKGROUND

1. Field

The disclosure relates to an electronic device including a plurality of wireless charging coils and an operating method thereof.

2. Description of Related Art

With the development of a wireless power transfer technique, many electronic devices are now utilizing the wireless power transfer technique for wireless charging or non-contact charging. The wireless power transfer technique is a technique which converts electric energy into a form of electromagnetic waves having a frequency and transfers energy to a load wirelessly without a transmission line. The wireless power transfer technique may be a technique in which power is transmitted from a power transmitting device to a power receiving device wirelessly to charge a battery of the power receiving device, without a connection established by a separate connector between the power receiving device and the power transmitting device. The wireless power transfer technique may include magnetic induction and magnetic resonance. In addition thereto, there may be other types of wireless power transfer techniques.

A magnetic induction type wireless power transfer system uses a scheme of transmitting power by using a magnetic field induced to a coil, that is, a technique which supplies energy to a load in such a manner that current is allowed to flow to a receiving coil by using a magnetic field generated from current flowing to a transmitting coil. A standard of a representative magnetic induction may be wireless power consortium (WPC), power matters alliance (PMA), or the like. A frequency used in power transmission may be a designated frequency band such as 110 to 205 kHz in case of WPC and 227 to 357 kHz, 118 to 153 kHz in case of PMA.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including wireless charging coils and an operating method thereof.

In accordance with an aspect of the disclosure, high-efficiency and high-power transmission is possible with charging performed by using a principle of wireless charging magnetic induction of an electromagnetic induction type. A distance between a wireless power transmitting coil (or a Tx coil) and a wireless power receiving coil (or an Rx coil) shall be close in distance enough to enable magnetic induction within a few millimeters. In addition, the magnetic induction requires alignment between the power transmitting coil and the power receiving coil to maximize power transmission efficiency.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of wireless charging coils and an operating method thereof may be provided.

In accordance with another aspect of the disclosure, an electronic device is provided. The electronic device includes a plurality of wireless charging coils and an operating method thereof may be provided to charge power receiving devices having different data packets (e.g., a wireless charging profile, a packet for selecting a charging coil, a type of an external device, requested power, or charging capacity) through respective coils disposed spaced apart from one another.

In accordance with another aspect of the disclosure, an electronic device is provided. The electronic device includes a housing forming an exterior of the electronic device, the housing including a concave portion couplable to a protrusion of one or more external electronic devices, among a plurality of external electronic devices, at an exterior of the electronic device, a first coil stored inside the housing and wound with a first number of turns, a second coil stored inside the housing, wound with a second number of turns, and disposed between the first coil and the concave portion, a power transmission circuit including a first connecting terminal electrically coupled to the first coil and a second connecting terminal electrically coupled to the second coil, a transceiver, and a control circuit. The control circuit is configured to check a data packet received from the external electronic device which is in proximity to the electronic device, control the transceiver to transmit first designated power to the external electronic device through the first coil wirelessly by using the power transmission circuit if the data packet satisfies a first condition, and control the transceiver to transmit second designated power to the external electronic device through the second coil wirelessly by using the power transmission circuit if the data packet satisfies a second condition.

In accordance with another aspect of the disclosure, an electronic device is provided. The electronic device includes a housing including a charging face facing a first external device or a second external device, a coil unit stored inside the housing, the coil unit including a first coil to transmit power for the first external device, and a second coil to transmit power for the second external device, and a shielding portion disposed below the coil unit. At least a part of the second coil is disposed to be higher than a lower end of the first coil.

In accordance with another aspect of the disclosure, a method of operating an electronic device is provided. The electronic device includes a housing including a concave portion, a first coil to transmit power for a first external device, and a second coil disposed coaxially with the first coil to transmit power for a second external device, wherein the first coil and the second coil are stored inside the housing to have different heights. The method includes outputting a signal for detecting the first external device or the second external device, and transmitting power through a corresponding coil out of the first coil or the second coil with respect to the detected external electronic device. The power transmission operation blocks leakage current induced to the remaining coil from being introduced to a power input terminal due to a coil which transmits power out of the first coil or the second coil.

According to various embodiments, an electronic device may charge different receiving devices with one charging device by allowing a second coil to be disposed inside a first coil.

According to various embodiments, heating which occurs due to misalignment of a transmitting coil and a receiving coil can be decreased when charging a smart watch.

According to various embodiments, heating can be reduced and charging efficiency can be highly improved and secured by minimizing a gap between a receiving device and a housing of a wireless charging device.

According to various embodiments, fine power control is possible to reduce electromagnetic interference (EMI) and heating.

According to various embodiments, leakage current generated during power transmission caused by different coils can be substantially blocked.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
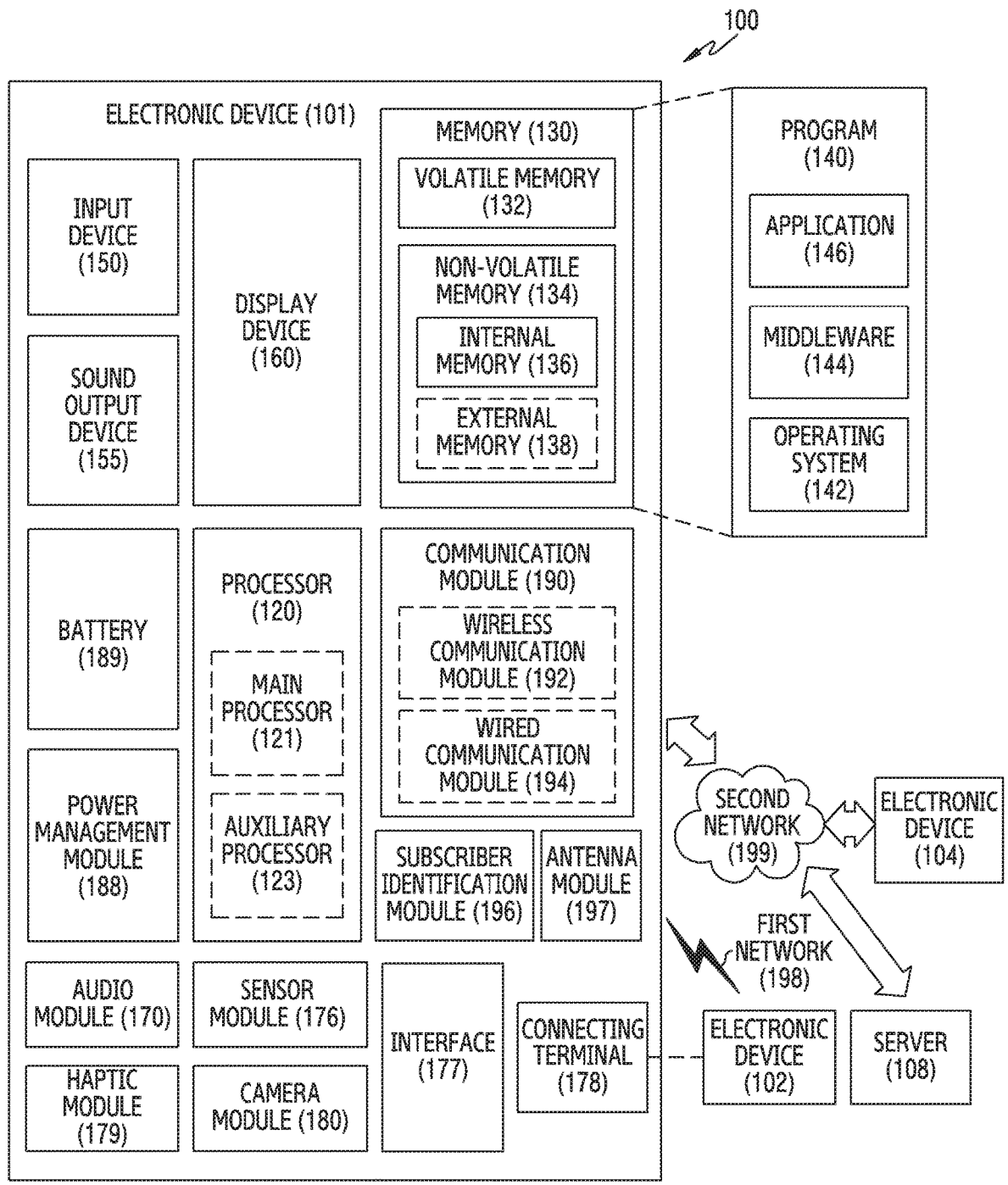
FIG. 1 is a block diagram illustrating an electronic device in a network environment, which has a structure in which a plurality of external devices are wirelessly charged by using a plurality of coils, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a Subscriber Identification Module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a High Definition Multimedia Interface (HDMI), a Universal Serial Bus (USB) interface, a Secure Digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a Power Management Integrated Circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments disclosed in the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
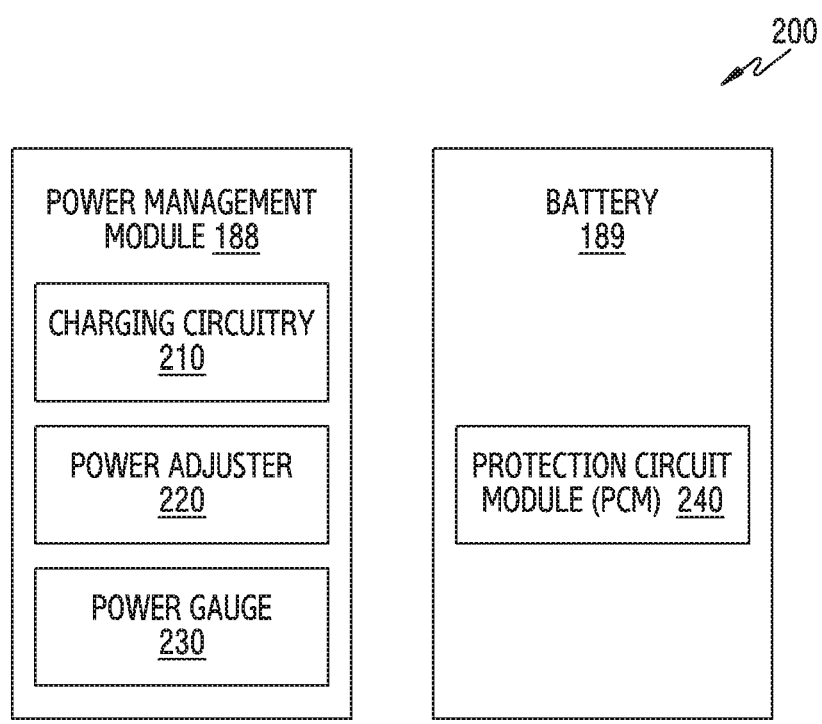
FIG. 2 is a block diagram for an electronic device (e.g., an electronic device 101 or electronic device 102 of FIG. 1) according to an embodiment of the disclosure.

FIG. 2 is a block diagram for an electronic device 200 (e.g., the electronic device 101 or the electronic device 102) according to an embodiment of the disclosure. The electronic device 200 may include the power management module 188 and the battery 189.

Referring to FIG. 2, the power management module 188 may include a charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
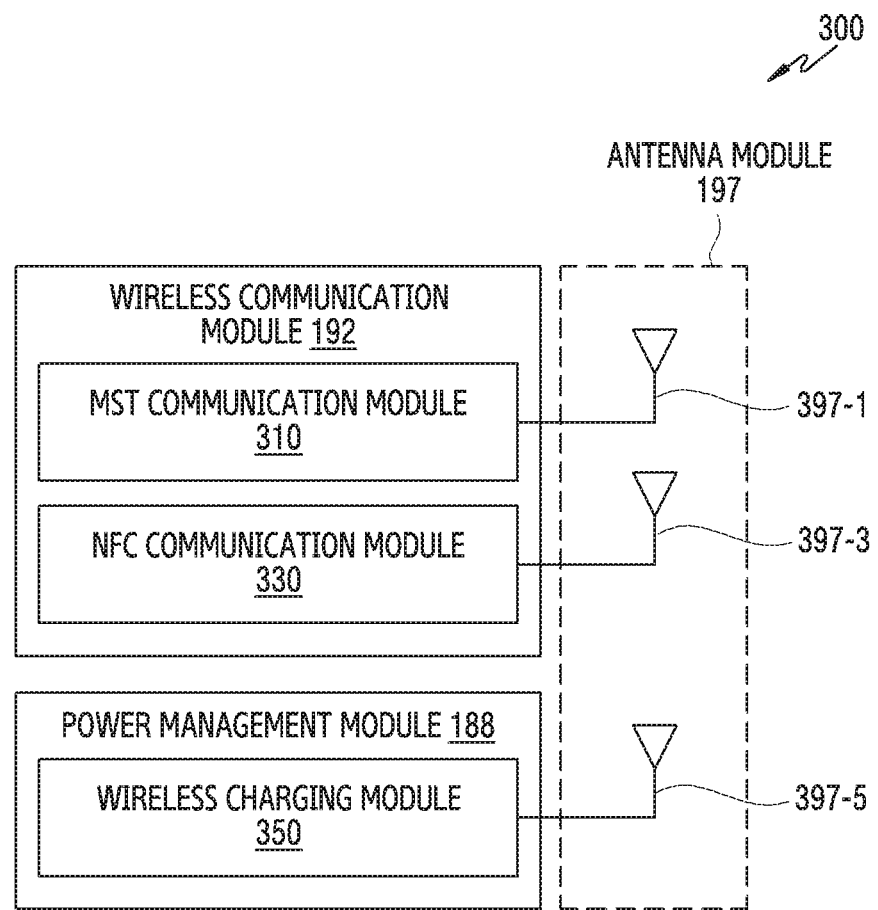
FIG. 3 is a block diagram for an electronic device (e.g., an electronic device 200 of FIG. 2) according to an embodiment of the disclosure.

FIG. 3 is a block diagram for an electronic device 300 (e.g., the electronic device 200) according to an embodiment of the disclosure. The electronic device 300 may include the wireless communication module 192, the power management module 188, and the antenna module 197.

Referring to FIG. 3, the wireless communication module 192 may include a magnetic secure transmission (MST) communication module 310 or a near-field communication (NFC) module 330, and the power management module 188 may include a wireless charging module 350. In such a case, the antenna module 197 may include a plurality of antennas that include an MST antenna 397-1 connected with the MST communication module 310, an NFC antenna 397-3 connected with the NFC communication module 330, and a wireless charging antenna 397-5 connected with the wireless charging module 350. For ease of description, the same components as those described in regard to FIG. 1 are briefly described or omitted from the description.

The MST communication module 310 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 397-1. To generate the magnetic signal, according to an embodiment, the MST communication module 310 may include a switching module (not shown) that includes one or more switches connected with the MST antenna 397-1, and control the switching module to change the direction of voltage or current supplied to the MST antenna 397-1 according to the received signal. The change of the direction of the voltage or current allows the direction of the magnetic signal (e.g., a magnetic field) emitted from the MST antenna 397-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the second network 199.

The NFC communication module 330 may obtain a signal containing control information or payment information such as card information from the processor 120 and transmit the obtained signal to the external electronic device 102 via the NFC antenna 397-3. According to an embodiment, the NFC communication module 330 may receive such a signal transmitted from the external electronic device 102 via the NFC antenna 397-3.

The wireless charging module 350 may wirelessly transmit power to the external electronic device 102 (e.g., a cellular phone or wearable device) via the wireless charging antenna 397-5, or wirelessly receive power from the external electronic device 102 (e.g., a wireless charging device). The wireless charging module 350 may support one or more of various wireless charging schemes including, for example, a magnetic resonance scheme or a magnetic induction scheme.

According to an embodiment, some of the MST antenna 397-1, the NFC antenna 397-3, or the wireless charging antenna 397-5 may share at least part of their radiators. For example, the radiator of the MST antenna 397-1 may be used as the radiator of the NFC antenna 397-3 or the wireless charging antenna 397-5, or vice versa.

In such a case, the antenna module 197 may include a switching circuit (not shown) adapted to selectively connect (e.g., close) or disconnect (e.g. open) at least part of the antennas 397-1, 397-3, or 397-5, for example, under the control of the wireless communication module 192 (e.g., the MST communication module 310 or the NFC communication module 330) or the power management module (e.g., the wireless charging module 350). For example, when the electronic device 101 uses a wireless charging function, the NFC communication module 330 or the wireless charging module 350 may control the switching circuit to temporarily disconnect at least one portion of the radiators shared by the NFC antenna 397-3 and the wireless charging antenna 397-5 from the NFC antenna 397-3 and to connect the at least one portion of the radiators with the wireless charging antenna 397-5.

According to an embodiment, at least one function of the MST communication module 310, the NFC communication module 330, or the wireless charging module 350 may be controlled by an external processor (e.g., the processor 120). According to an embodiment, specified functions (e.g., a payment functions) of the MST communication module 310 or the NFC communication module 330 may be performed in a trusted execution environment (TEE). According various embodiments, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The aforementioned electronic devices (e.g., the electronic device 102 of FIG. 1) may be described as an "external electronic device" or an "outside electronic device" in the following description of various embodiments. In addition, in the following description, the "external electronic device" or the "outside electronic device" may be described as a wireless power receiving device, and may be used in combination with terms such as an external device, an external electronic device, a receiving apparatus, a receiving device, a receiving unit, a receiver, or the like. The "external electronic device" or the "outside electronic device" may be an external electronic device to be charged wirelessly, by receiving power wirelessly by means of an electronic device according to various embodiments.

In the following description, an electronic device may be a wireless charging device to be charged wirelessly, by transmitting power wirelessly to the aforementioned "external electronic device" or "outside electronic device". Hereinafter, the electronic device may be described as a "wireless charging device", and the "wireless charging device" may be used in combination with terms such as a wireless power transfer device, a wireless power transmission device, a power transfer device, a transfer device, a transmitting device, a transmitting unit, a transmitter, or the like.

In the following description, a "coil" described as being coupled to a power transmission circuit of a wireless charging device may be used in combination with terms such as a transmitting coil, a transfer coil, or the like. It may be described that the transmitting coil includes a first coil and a second coil.

A wireless power transmission system described hereinafter generally includes a travel adapter (TA) which supplies power by converting alternating current (AC) power to direct current (DC) power, a wireless charging transmitting unit Tx which converts received DC power to Ac power to transmit power through a transmitting coil, a wireless charging receiving unit Rx which receives AC power transmitted from the transmitting coil by using a receiving coil and converts it to DC power to produce DC power with a specific magnitude, and an external device which receives rectified DC power from the receiving unit. In the wireless power transmission system, the TA and the wireless charging transmitting unit may be electrically coupled, and the external device may include the wireless charging receiving unit.

Hereinafter, a structure of an electronic device according to various embodiments will be described.

Figure 4:
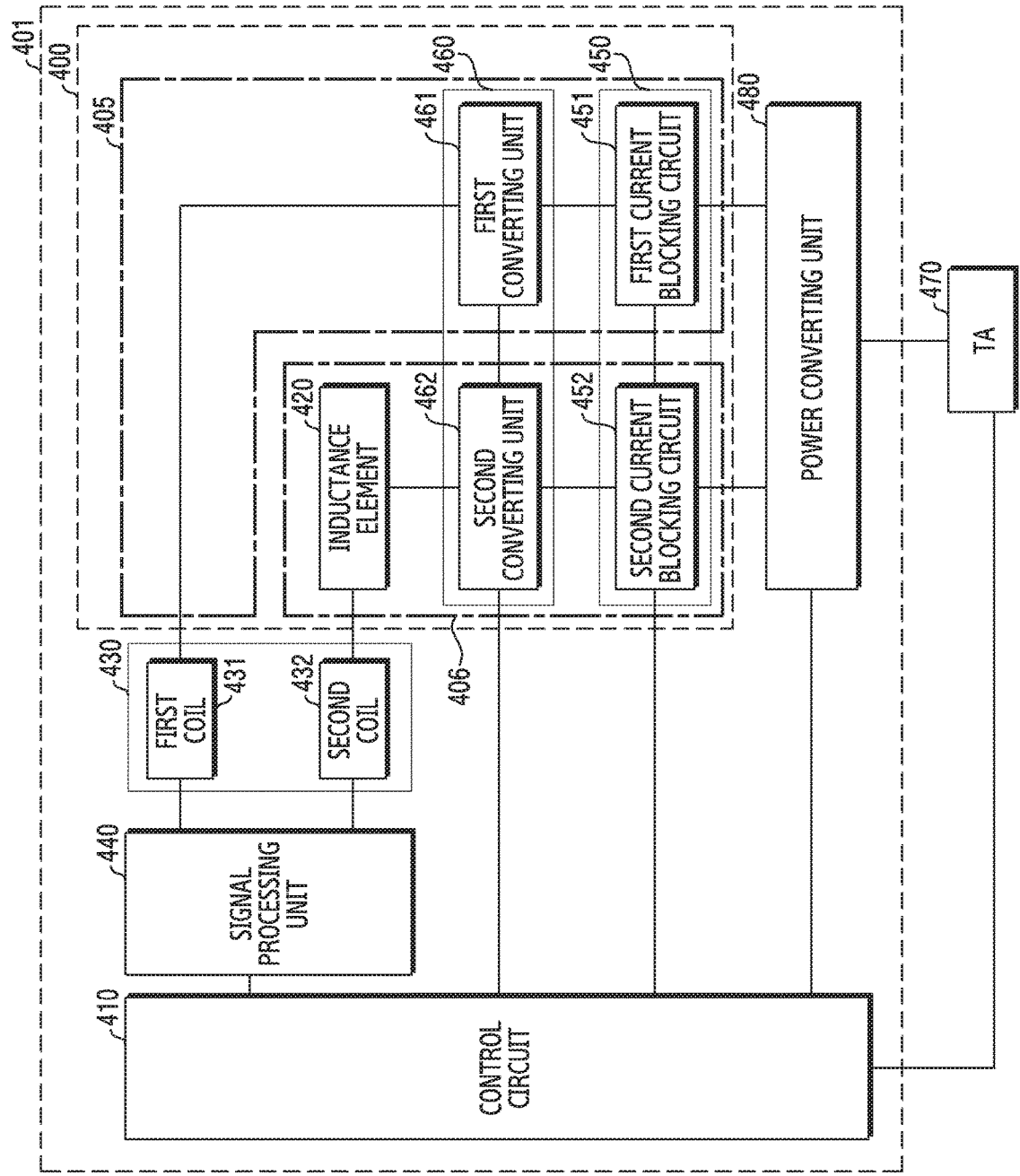
FIG. 4 illustrates a structure of an electronic device according to an embodiment of the disclosure.

FIG. 4 illustrates a structure of an electronic device according to an embodiment of the disclosure.

An electronic device 401 of FIG. 4 (e.g., the electronic device 300) may be similar at least in part to the electronic device 101 of FIG. 1, or may include other embodiments of the electronic device.

Referring to FIG. 4, the electronic device 401 according to various embodiments may include a wireless charging device. The electronic device 401 according to various embodiments may include a device which supplies power to an external electronic device (e.g., 102 of FIG. 1). For example, the electronic device 401 may be electrically coupled to a travel adapter (TA) 470 to supply power to a battery of the external electronic device 102.

The external electronic device 102 which is wirelessly charged through the electronic device 401 according to various embodiments may include a plurality of external electronic devices having different data packets (e.g., a wireless charging profile, a packet for selecting a charging coil, a type of an electronic device, requested power, or charging capacity). In an embodiment, the external electronic device may include a first external electronic device having a first data packet and a second external electronic device having a second data packet, which is distinguished from the first external electronic device. In an embodiment, the first external electronic device may include, for example, a smart phone (not shown) including the first data packet. In an embodiment, the second external electronic device may include, for example, a smart watch (e.g., a smart watch 600 of FIG. 6) including the second data packet. Hereinafter, the first external electronic device may be described as the smart phone, and the second external electronic device may be described as the smart watch 600 including a data packet, which is different from the first external electronic device. However, without being limited thereto, apparently, it is easily applicable by those ordinarily skilled in the art as long as it is an electronic device which can be charged wirelessly.

The electronic device 401 according to various embodiments may include a power transmission circuit 400, a control circuit 410, a coil unit 430, a signal processing unit 440, and a power converting unit 480. In various embodiments, the power transmission circuit 400 may include a converting unit 460. In various embodiments, the power transmission circuit 400 may further include at least one of an inductance element 420 and a current blocking circuit 450. The coil unit 430 may include a plurality of power transmitting coil electrically interacting with respective power receiving coils provided in a plurality of external electronic device.

At least part of the power transmission circuit 400, control circuit 410, and signal processing unit 440 according to various embodiments may be included in a printed circuit board (PCB) (not shown).

The electronic device 401 according to various embodiments may include the coil unit 430. The coil unit 430 may include a plurality of coils. In an embodiment, the coil unit 430 may include a first coil 431 and a second coil 432. In an embodiment, the first coil 431 may transmit wireless power to a designated external device (e.g., the electronic device 101), and the second coil 432 may transmit wireless power to another designated external device (e.g., the electronic device 101). The first coil 431 may be a coil for selectively transmitting power to the first external device (e.g., a smart phone (not shown)) including the first data packet. The first coil 431 may be coupled to a first power transmission circuit 405 through a first connecting terminal (not shown). The second coil 432 may be a coil for selectively transmitting power to the second external device (e.g., the smart watch 600 of FIG. 6) including the second packet, which is distinguished from the first external device. The second coil 432 may be coupled to a second power transmission circuit 406 through a second connecting terminal (not shown). In this case, the second external device corresponding to the second coil 432 may be the smart watch (e.g., 600 of FIG. 6).

In various embodiments, the coil unit 430 may transmit a signal associated with charging power or wireless charging to the external electronic device 102. The coil unit 430 may receive the signal transmitted from the external electronic device 102.

In various embodiments, each of the first coil 431 and the second coil 432 may be wound with different numbers of turns. The first coil 431 and the second coil 432 may be disposed to have different heights. In an embodiment, a height of a lower end of the second coil 432 may be disposed to be higher than a height of a lower end of the first coil 431. In various embodiments, the first coil 431 and the second coil 432 may be wound in various shapes. In an embodiment, the first coil 431 and the second coil 432 may be wound in the same shape. In another embodiment, the first coil 431 and the second coil 432 may be wound in different shapes. In an embodiment, at least one of the first coil 431 and the second coil 432 may have a substantially constant thickness and may be wound to have a circular cross-section. In an embodiment, at least one of the first coil 431 and the second coil 432 may have a substantially constant thickness and may be wound to have a rectangular cross-section. However, without being limited thereto, the coils may be wound in various shapes to transmit power wirelessly. In an embodiment, the second coil 432 may be disposed to an inner side in an axial direction of the first coil 431. In an embodiment, an outer face of the second coil 432 may be spaced apart from an inner face of the first coil 431. In an embodiment, an outer diameter of the second coil 432 may be smaller than an inner diameter of the first coil 431. In another embodiment, at least part of the second coil 432 may be disposed to vertically overlap with at least part of the first coil 431.

The power transmission circuit 400 according to various embodiments may include the converting unit 460. In various embodiments, the converting unit 460 may convert DC power to AC power for charging through switching control. In various embodiments, the converting unit 460 may include a first converting unit 461 coupled to the first coil 431 and a second converting unit 462 coupled to the second coil 432. In an embodiment, the TA 470 of the converting unit 460 may be electrically coupled.

The power transmission circuit 400 according to various embodiments may further include an inductance element 420. In various embodiments, the inductance element 420 may include a lumped inductor. In various embodiments, the inductance element 420 may be electrically coupled to at least one of the first coil 431 and the second coil 432. In an embodiment, the inductance element 420 may be coupled to the second coil 432. In an embodiment, the inductance element 420 may be disposed between the second coil 432 and the second converting unit 462. The inductance element 420 may compensate for inductance of the second coil 432. The inductance element 420 may minimize electromagnetic interference (EMI) and heating of the second coil 432.

The power transmission circuit 400 according to various embodiments may further include the current blocking circuit 450. Hereinafter, the current blocking circuit 450 may be used in combination with the term "current blocking switch". The current blocking circuit 450 may be disposed to a power input terminal of the power transmission circuit 400. In various embodiments, the current blocking circuit 450 may be disposed between the converting unit 460 and the power converting unit 480. According to the control of the current blocking circuit 450, power can be supplied to the converting unit 460, and it is possible to reduce or block reverse current induced from an adjacent transmission power circuit from being introduced to the power input terminal. In various embodiments, the current blocking circuit 450 may be disposed to at least one of the first power transmission circuit 405 and the second power transmission circuit 406. In an embodiment, the current blocking circuit 450 may include a first current blocking circuit 451 disposed to a power input terminal of the first power transmission circuit 405 and a second current blocking circuit 452 disposed to a power input terminal of the second power transmission circuit 406. In an embodiment, the control circuit 410 may control the first current blocking circuit 451 to be OFF to block an electrical connection of power V_Bridge and the first coil 431, when power is supplied through the second transmission power circuit 406. In this case, the first current blocking circuit 451 may block the reverse current flowing to the first power transmission circuit 405 by means of the second coil 432 from being introduced to the power input terminal. In an embodiment, the control circuit 410 may control the second current blocking circuit 452 to be OFF to block an electrical connection of power V_Bridge and the second coil 432, when power is supplied through the first transmission power circuit 405. In this case, the second current block circuit 452 may block the reverse current flowing to the second power transmission circuit 406 by means of the first coil 431 from being introduced to the power input terminal. In various embodiments, each of the first and second current blocking circuits 451 and 452 may include a p-type metal-oxide-semiconductor field-effect transistor (P-MOSFET). For example, the electrical connection between the V_Bridge and the coil may be OFF by means of the P-MOSFET.

In various embodiments, the power transmission circuit 400 may transmit power to the external device 102 wirelessly through the coil unit 430. In various embodiments, the power transmission circuit 400 may include a power transmission circuit 400 for wirelessly transmitting power to the first external electronic device and the second external electronic device 600, and the power transmission circuit 400 may include one power transmission circuit (the first power transmission circuit 405) or two or more power transmission circuits (the first power transmission circuit 405 and the second power transmission circuit 406). In an embodiment, one power transmission circuit (the first power transmission circuit) may include an additional switching element to selectively transmit power for different external devices (e.g., the first external electronic device and the second external electronic device).

In various embodiments, the first power transmission circuit 405 may include the first converting unit 461 and the first current blocking circuit 451. In various embodiments, when power is transmitted to an external device (e.g., the smart watch 600) through the second coil 432 that can be disposed adjacent to the first coil 431, the first current blocking circuit 451 may block reserve current, which flows to the first power transmission circuit 405 due to leakage current caused by the second coil 342, from being introduced to a power source terminal.

In various embodiments, the second power transmission circuit 406 may include the second coil 432, the second converting unit 462, and the second current blocking circuit 452. In various embodiments, when power is transmitted to the first external device through the first coil 431 that can be disposed adjacent to the second coil 432, the second current blocking circuit 452 may block reverse current, which flows to the second power transmission circuit 406, from being introduced to a power source terminal due to leakage current caused by the first coil 431.

The electronic device 401 according to various embodiments may include the signal processing unit 440.

In various embodiments, the signal processing unit 440 may detect a data packet transmitted from the external electronic device 102 through the coil unit 430 coupled to the power transmission circuit 400, and may operate to transmit operational and/or state information of the electronic device 401 through the coil unit 430.

The electronic device 401 according to various embodiments may include the TA 470. In various embodiments, the TA 470 may be electrically coupled to the electronic device 401, and may generate at least one power source for wireless power transmission with respect to different external electronic devices. In various embodiments, the TA 470 may be directly coupled to in-door AC power, and may include an AC/DC converting unit to convert the AC power to DC power for charging.

The TA 470 according to various embodiments may generate the DC power and supply it to the converting unit 460. For example, it may be coupled through a connecting terminal (not shown) from the outside of the electronic device 401.

The electronic device 401 according to various embodiments may include the power converting unit 480. When power is supplied from a power unit (e.g., the TA 470), the power converting unit 480 may perform a function of converting it into power of determined strength.

The electronic device 401 according to various embodiments may include the control circuit 410.

In various embodiments, the control circuit 410 may be configured to detect the presence of the external device 102, identify a type of each external device 102, provide charging, control heating, and control a communication operation with respect to the external device 102. The control circuit 410 according to another embodiment may be configured to control power to be supplied (or output) on the basis of a signal processed in the signal processing unit 440.

The control circuit 410 according to various embodiments may check whether the external device 102 is in proximity to a surface of a housing 700 of the electronic device 401 through the signal processing unit 440. For example, an antenna device electrically coupled to each transmitting coil unit 430 or each transmission unit 430 may transmit a ping signal to the external device. The control circuit 410 may detect the presence of the external device through the ping signal. The control circuit 410 may receive a corresponding signal from the external device 102, and may detect signal strength and/or a programmable real time unit (PRU) parameter or the like to detect whether the external device 102 is mounted. In an embodiment, the control circuit 410 may detect whether an external device (e.g., the smart watch 600) corresponding to the second coil 432 approaches a concave portion of the housing 700 corresponding to the second coil 432.

The control circuit 410 may identify each external device 102 through the signal processing unit 440. Upon detecting the presence of the external device, the control circuit 410 may receive a specific signal or transmit a specific signal through the first coil 431 or the second coil 432, and may receive a signal transmitted from the external device 102 in response thereto to identify a variety of information of the external device 102 (e.g., a packet for selecting a charging coil, a type of the external device, required power, charging capacity, etc.). In an embodiment, upon detecting the approach of one external device (e.g., the smart watch 600) through the first coil 431 and the second coil 432, a data packet received from the smart watch 600 may be analyzed to transmit power only through any one corresponding coil (e.g., the second coil 432).

In various embodiments, the control circuit 410 may perform a charging mode control operation. In various embodiments, power may be transmitted through the coil unit 430 corresponding to an identified external device out of the first coil 431 and the second coil 432. In an embodiment, the control circuit 410 may detect and identify the smart watch 600 which approaches a second region 7052 of the housing 700 to transmit power wirelessly through the second coil 432 corresponding to the smart watch 600. In an embodiment, the control circuit 410 may transmit power wirelessly through the second coil 432 corresponding to the smart watch 600 by performing the aforementioned detection and identification operation when the smart watch 600 is mounted to a concave portion 710 of the housing 700. In an embodiment, if a recognized external device is a smart phone, the control circuit 410 may transmit charging power wirelessly through the first coil 431 corresponding to the smart phone.

In various embodiments, the control circuit 410 may control the converting unit 460 through switching control in a charging mode to convert DC power of the TA 470 to AC power for charging. In various embodiments, DC power to be transmitted may be generated through the first coil 431 and the second coil 432 according to a proper communication interface.

In various embodiments, the control circuit 410 may receive information related to a charging state of the external device 102 through the signal processing unit 440, and analyze state information of the external device 102 on the basis of the received information to adjust current strength of charging power. For example, according to fixed voltage based on a charging condition, the control circuit 410 may increase a switching control signal (switching frequency) to decrease charging power to be supplied or may decrease the switching control signal to increase the charging power to be supplied.

In various embodiments, the control circuit 410 may receive a charging completion signal transmitted from the external device 102 through the coil unit 430 and the signal processing unit 440. For another example, upon receiving the charging completion signal of a battery from the external device 102 in the charging mode or receiving a signal informing that charging is performed with specific voltage during a specific time period, the control circuit 410 may determine this as a full charging state and end the charging mode.

Upon completion of charging according to various embodiments, the electronic device 401 may receive a signal including at least part of information associated with the charging end from the external device 102. The coil unit 430 of the power transmission circuit 400 according to another embodiment may receive information including at least part of information associated with the charging completion from the external device 102. At least part of the received information may be a charging end request signal.

The signal processing unit 440 according to various embodiments may transmit at least part of a signal associated with the received signal to the control circuit 410.

According to various embodiments, upon receiving a signal including at least part of the information associated with the charging end from the signal processing unit 440, the control circuit 410 may control the TA 470 and the power converting unit 480 to end the charging operation.

Figure 5:
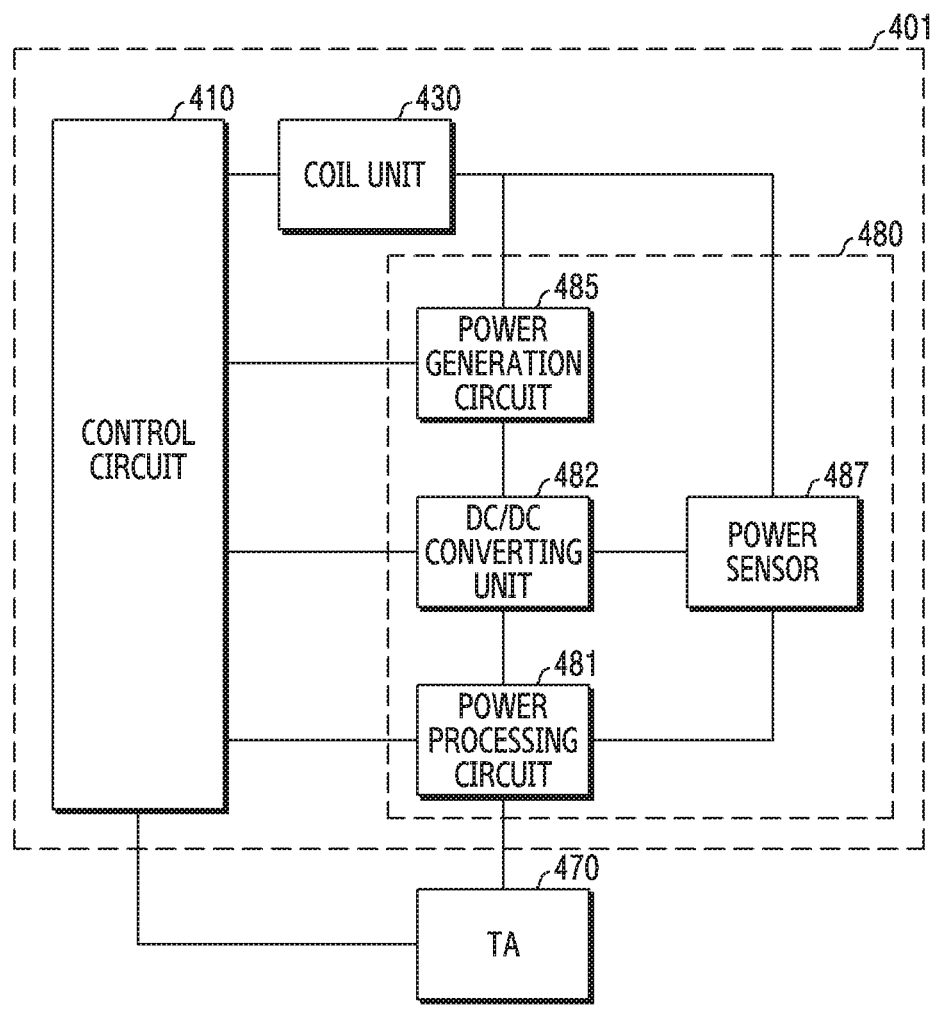
FIG. 5 illustrates a structure of a power converting unit of FIG. 4 according to an embodiment of the disclosure.

FIG. 5 illustrates a structure of the power converting unit 480 of FIG. 4 according to an embodiment of the disclosure.

Referring to FIG. 5, the electronic device 401 according to various embodiments may include the power converting unit 480. When power is supplied from a power unit (e.g., the TA 470), the power converting unit 480 may convert this into power of determined strength. The power converting unit 480 may include a power processing circuit 481, a DC/DC converting unit 482, a power sensor 487, and a power generation circuit 485. The power generation circuit 485 may generate a signal to be applied to a coil. The DC/DC converting unit 482 may perform a function for converting DC power supplied from the power unit to DC power of specific strength according to a control signal of the control circuit 410. The power sensor 487 may measure voltage/current or the like of DC-converted power, and may provide the measured voltage/current value to the control circuit 410. The power sensor 487 may measure voltage/current of a signal which is output from the power generation circuit and applied to the coil, and may provide the voltage/current value to the control circuit 410.

In various embodiments, the control circuit 410 may block power supplied from the power unit adaptively on the basis of the voltage/current value measured by the power sensor 487, or may control power or voltage/current for supplying power to the DC/DC converting unit 482 or the power generation circuit 485.

In various embodiments, the power converting unit 480 may further include the power processing circuit 481 which blocks power supplied from the power unit or which blocks or adjusts power supplied to the power generation circuit 485.

In various embodiments, the power generation circuit 485 may generate a power signal to be applied to a coil to charge the external electronic device by receiving power supplied from the DC/DC converting unit 482.

In various embodiments, the control circuit 410 may receive a specific power control signal generated by a receiving device. The control circuit 410 may change a signal generated in the power generation circuit 485 on the basis of the power control signal received from the receiving device.

Figure 6A:
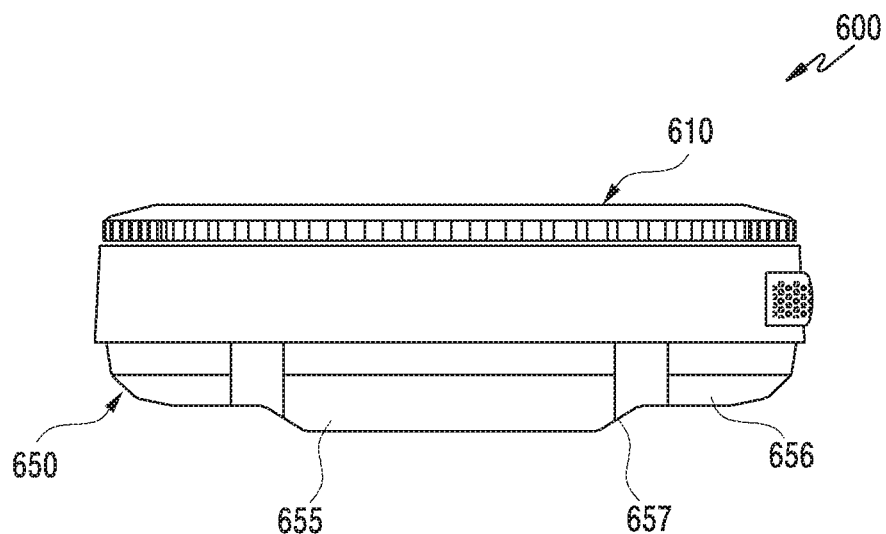
FIG. 6A is a side view for a smart watch as an example of an external electronic device which can be charged wirelessly by a wireless charging device according to an embodiment of the disclosure.
Figure 6B:
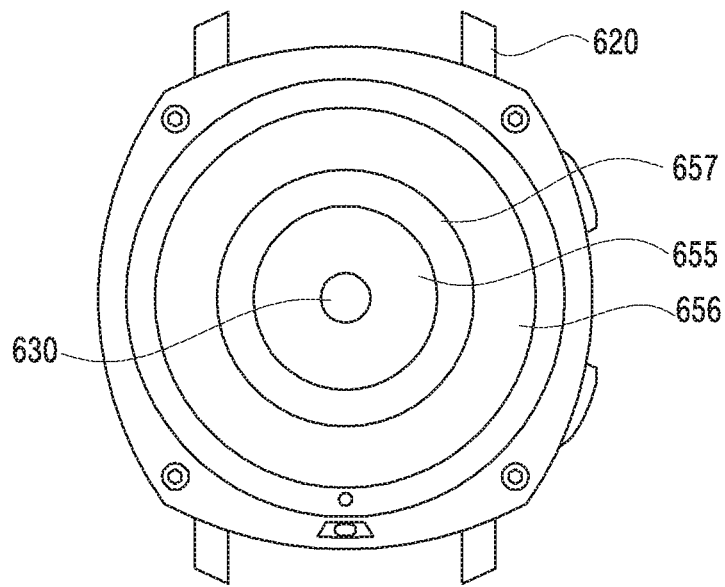
FIG. 6B is a rear view for a smart watch of FIG. 6A according to an embodiment of the disclosure.

FIG. 6A is a side view for the smart watch 600 as an example of an external electronic device (e.g., 101 of FIG. 1) which can be charged wirelessly by a wireless charging device (e.g., 401 of FIG. 4) according to an embodiment of the disclosure. FIG. 6B is a rear view for the smart watch 600 of FIG. 6A according to an embodiment of the disclosure.

Referring to FIGS. 6A and 6B, in an embodiment, the smart watch 600 may include a front face 610 in which a display (e.g., the display device 160 of FIG. 1) is exposed and a rear face 650 facing away from the front face 610. When the smart watch 600 is worn on a user's wrist, the rear face 650 may face and be in contact with the user's wrist. According to an embodiment, the smart watch 600 may include various biometric sensors disposed to or near the rear face 650. For example, the biometric sensor may acquire a variety of biometric information (e.g., pulsation, blood pressure, etc.) through the user's wrist which faces and is in contact with the rear face 650. According to an embodiment, the biometric sensor may include a heartbeat rate monitoring (HRM) sensor 630. The smart watch 600 may include lugs 620 (or lug ends) to which a strap or bracelet (not shown) can be attached.

In various embodiments, the biometric sensor may be a sensor which utilizes light, and may include, for example, a light emitting unit (or a light source) and a light receiving unit. Light output from the light emitting unit may be reflected or scattered from the user's wrist, and the reflected or scattered light may be introduced to the light receiving unit. The light receiving unit may generate a signal regarding biometric information on the basis of the light.

In an embodiment, the rear face 650 of the smart watch 600 may include a protrusion 655 having a relatively protruding shape in a direction from the front face 610 to the rear face 650, and the HRM sensor 630 may be disposed to a space provided in the protrusion 655.

In an embodiment, the rear face 650 of the smart watch 600 may include a peripheral portion 656 disposed around the protrusion 655 and an inclined portion 657 connecting the protrusion 655 and the peripheral portion 656. For example, the wireless charging device 401 of FIG. 4 may have a mounting portion corresponding to the rear face 650 of the smart watch 600, and the smart wrist 600 may be disposed to the mounting portion of the electronic device 401 (e.g., a wireless charging device) so that it is present without being shaken.

In an embodiment, referring to FIG. 6B, the smart watch 600 may include a receiving coil 640 disposed around the HRM sensor 630. When the smart watch 600 is mounted to the wireless charging device (e.g., 401 of FIG. 4), the receiving coil 640 may be aligned with a corresponding coil (e.g., the second coil 432) of the wireless charging device 401. For example, if the protrusion 655 of the smart watch 600 is inserted to a recess (or a concave portion) provided in a mounting portion of the wireless charging device 401, the receiving coil 640 may be aligned while located near the second coil 432 of the wireless charging device 401, thereby ensuring wireless charging efficiency for wireless power transmission/reception between the smart watch 600 and the wireless charging device 401.

In an embodiment, a wireless charging device (e.g., 401 in FIG. 4) transmits a ping signal to a wireless power receiving device (e.g., the smart watch 600 of FIG. 6A or 6B), and the wireless power receiving device may transmit a response signal (e.g., a data packet) to the wireless charging device 401 in response thereto. The wireless charging device 401 may include a variety of information regarding the wireless power receiving device (e.g. a packet for selecting a charging coil (or a wireless power transmitting coil), a type of the wireless power receiving device, power required in the wireless power receiving device, charging capacity of the wireless power receiving device, or the like) on the basis of the response signal received from the wireless power receiving device.

According to various embodiments, the wireless charging device (e.g., 401 of FIG. 4) may identify whether the wireless power receiving device accesses a corresponding charging coil (or a wireless power transmitting coil) through a response signal received from a wireless power receiving device (e.g., a first external electronic device or a second external electronic device).

According to various embodiments, the wireless charging device (e.g., 401 of FIG. 4) may identify whether the wireless power receiving device is mounted to the mounting portion of the wireless charging device 401 through the response signal received from the wireless power receiving device (e.g., the first external electronic device or the second external electronic device).

Figure 7A:
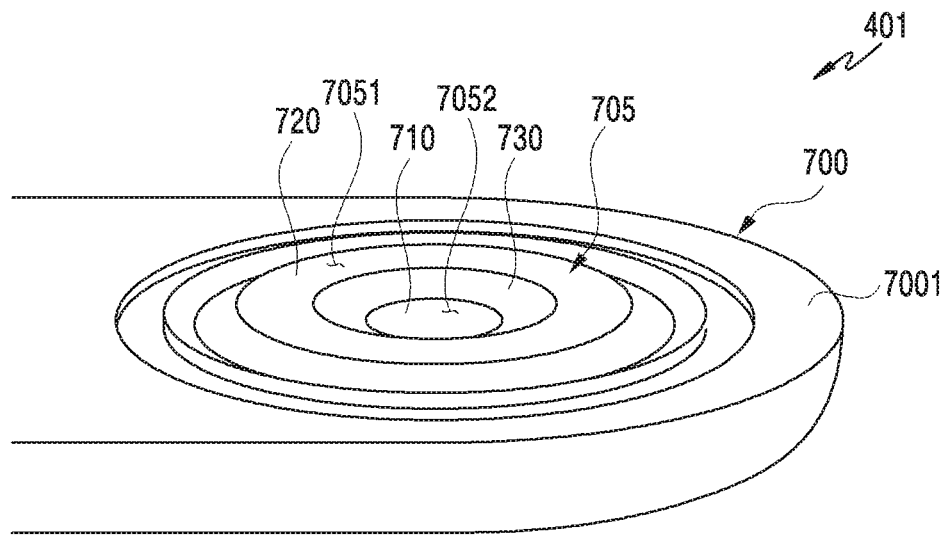
FIG. 7A is a perspective view of an electronic device according to an embodiment of the disclosure.
Figure 7B:
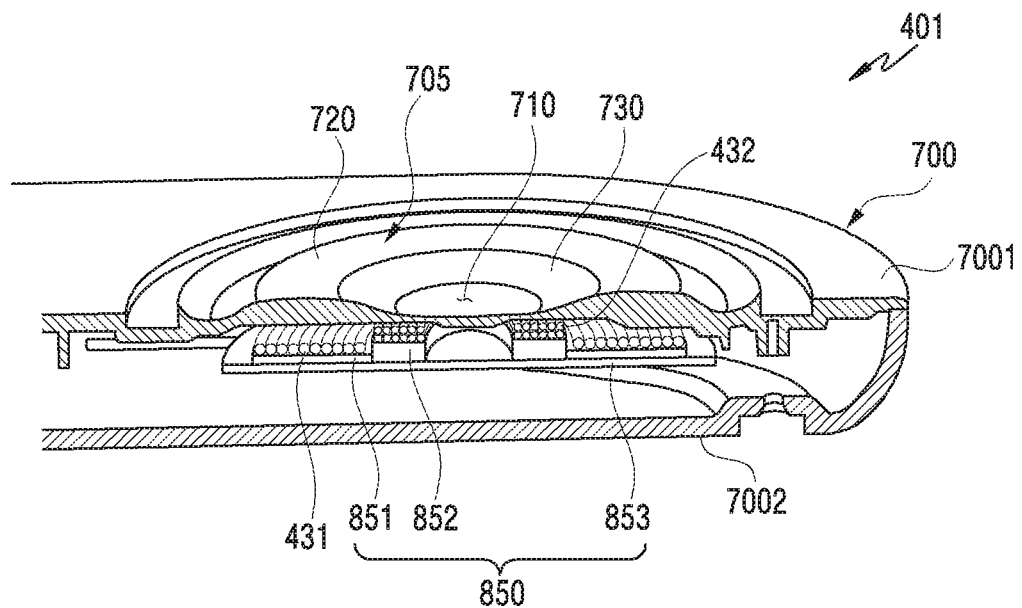
FIG. 7B is a partial cross-sectional view of an electronic device of FIG. 7A according to an embodiment of the disclosure.

FIG. 7A is a perspective view of the electronic device 401 of FIG. 4 according to an embodiment of the disclosure. FIG. 7B is a partial cross-sectional view of the electronic device 401 of FIG. 7A according to an embodiment of the disclosure.

Referring to FIGS. 7A and 7B, part of the electronic device 401 according to various embodiments may include a housing 700. The housing 700 may construct an exterior of the electronic device 401, and may include a front face 7001 and a rear face 7002 which are disposed opposite to each other. A component (e.g., the power transmission circuit 400, the control circuit 410, the signal processing unit 440, and the power converting unit 480) of the electronic device 401 according to various embodiments may be housed inside the housing 700. The front face 7001 of the housing 700 may include a charging face 705 which constructs a wireless charging interface by facing a wireless power receiving device (hereinafter, simply a receiving device). The external device 102 (e.g., the smart watch 600 or smart phone of FIG. 6A or 6B) for receiving power provided wirelessly from the wireless charging device 401 may be disposed to face at least part of the charging face 705. In various embodiments, a different type of the receiving device 102 may be charged through the wireless charging device 401. Each receiving device may be a different type of a receiving device (e.g., a smart phone (not shown) and the smart watch 600). Each receiving device may include the first external electronic device and the second external electronic device which can be distinguished through different data packets. In various embodiments, the charging face may be divided into regions for supplying power to each receiving device. Hereinafter, different receiving devices facing the charging face 705 of the housing 700 may be described respectively as the first external electronic device and the second external electronic device. The charging face 705 of the housing 700 according to various embodiments may include a first region 7051 which is a charging region for the first external electronic device and a second region 7052 which is a charging region for the second external electronic device.

The second region 7052 according to various embodiments may be a region for charging the second external electronic device. According to an embodiment, the second region 7052 may be defined as a region aligned with the second coil 432 for transmitting wireless power to the second external electronic device (e.g., the smart watch 600 of FIG. 6A or 6B). When the second external electronic device is disposed to the charging face 705, the electronic device 401 may detect and identify the second external electronic device, and may utilize the second region 7052 to execute wireless charging (e.g., wireless power transmission) for the second external electronic device. According to an embodiment, the first region 7051 may be disposed to an exterior (external, outer, outside) region of the second region 7052, and the second region 7052 may include a circular ring-shaped region surrounding the first region 7051. For example, the second region 7052 may be a region disposed inwardly in a radial direction of the first region 7051 in the charging face 705.

In an embodiment, the second region 7052 may include the concave portion 710 which is concave in a direction from the front face 7001 to the rear face 7002. The concave portion 710 may have a shape corresponding to the protrusion 655 disposed to a rear face of the smart watch 600 of FIG. 6A or 6B. For example, the concave portion 710 may have a width or depth that can fit the protrusion (655 of FIG. 6A or 6B). In an embodiment, since the protrusion (655 of FIG. 6A or 6B) is inserted to the concave portion 710, an interval between a receiving coil (e.g., 640 of FIG. 6B) and the second coil 432 may be minimized.

According to an embodiment, the second region 7052 may include a first peripheral portion 730 disposed around the concave portion 710. The first peripheral portion 730 may include an inclined face of which a height increases, for example, towards the first region 7051 from the second region 7052. According to an embodiment, the inclined face may have a convex shape corresponding to the inclined portion 657 disposed to a rear face of the smart watch 600 of FIG. 6A or 6B. According to some embodiments, when the inclined portion 657 disposed to the rear face of the smart watch 600 of FIG. 6A or 6B includes a planar face, the inclined face may include a planar face corresponding thereto.

According to an embodiment, when the smart watch 600 of FIG. 6A or 6B is mounted to the front face 7001 of the housing 700, the protrusion 655 and inclined portion 657 of the smart watch 600 is fit to the second region 7052 of the housing 700, and a receiving coil (e.g., 640 of FIG. 6B) of the smart watch 600 may be aligned while located near the second coil 432 disposed inside the housing 700. When the receiving coil 640 of the smart watch 600 and the second coil 432 of the electronic device 401 are aligned while located nearby (e.g., less than or equal to a determined distance), wireless charging efficiency for wireless power transmission/reception between the smart watch 600 and the electronic device 401 can be ensured.

For example, heating may occur during wireless charging because of misalignment between a transmitting coil and a receiving coil. According to an embodiment, the heating can be reduced when the receiving coil 640 of the smart watch (e.g., 600 of FIG. 6A or 6B) and the second coil 432 of the electronic device 401 are aligned while located nearby.

According to an embodiment, an alignment member (not shown) may be further included inside the housing 700 to perform alignment between the receiving coil 640 and the second coil 432 through interaction with the alignment member (not shown) disposed inside the second external electronic device (e.g., the smart watch 600 of FIG. 6A or 6B). For example, the electronic device 401 and/or the second external electronic device may include one or more magnets, and attractive force caused by the magnets may guide and maintain the alignment between the electronic device 401 and the second external electronic device. In addition thereto, various other alignment members may be disposed to the electronic device 401 and/or the second external electronic device. According to an embodiment, at least part of the second region 7052 may overlap with the second region 7052. In another embodiment, the second region 7052 may be included in the first region 7051.

The first region 7051 of the charging face 705 of the housing 700 according to various embodiments may be a region for charging the first external electronic device (e.g., a smart phone). According to an embodiment, the first region 7051 may be defined as a region aligned with the first coil 431 for transmitting wireless power to the first external electronic device. When the first external electronic device is disposed to the charging face 705, the electronic device 401 may detect and identify the first external electronic device, and may execute wireless charging (e.g., wireless power transmission) for the first external electronic device by utilizing the first region 7051.

The first region may be a circumferential region of the second region. Alternatively, the first region 7051 may be a region further including the circumference of the second region 7052. The first coil 431 may be disposed inside the housing 700 corresponding to the first region 7051 of the charging face 705. The first region 7051 of the housing 700 may imply an upper face of the first coil 431 in a vertical direction. Alternatively, the first region 7051 of the housing 700 may imply an upper face of the first coil 431 and an internal region of the first coil 431 in a vertical direction. Without being limited thereto, regarding the charging face 705 of the housing 700, the first region 7051 may imply a region capable of transmitting power wirelessly to an external device (e.g., the first external electronic device) caused by an electromagnetic field of the first coil 431. In an embodiment, the first region 7051 may be disposed to a circumference of the second region 7052, and the second region 7052 may imply a region disposed inwardly in a radial direction of the first region 7051. In an embodiment, the first region 7051 may be explained in concept that at least part of the second region 7052 is included. In an embodiment, the first region 7051 of the charging face 705 may include at least part of a region of an outer portion 720 or inclined portion 730 disposed to an outer circumference of the concave portion 710. The outer portion 720 may have substantially the same height as a face other than the charging face 705 in the housing 700. In another embodiment, a convex portion 720 disposed convexly towards a vertical direction may be disposed to the first region 7051 of the charging face 705. In this case, the convex portion 720 may be disposed in a shape which surrounds the circumference of the concave portion 710. The inclined portion 730 may be disposed inwardly in a radial direction of the convex portion. Although the second coil 432 may be disposed inside the housing 700 corresponding to the convex portion 720, without being limited thereto, at least part of the second coil 432 may be disposed at a location corresponding to the inclined portion 730. The convex portion 720 may be in contact with a region other than the protrusion 655 in a rear face of the second external electronic device 600 (e.g., a smart watch). Although the second coil 432 may be disposed inside the housing 700 corresponding to the concave portion 710, without being limited thereto, at least part of the second coil 432 may be disposed at a location corresponding to the inclined portion 730. Accordingly, even if a user does not undergo an additional alignment process, the receiving coil 640 of the smart watch 600 and the second coil 432 of the housing 700 can be aligned, thereby increasing charging efficiency. Referring to FIG. 7B, a shielding portion 850 for shielding a magnetic field of the coil unit 430 (e.g., a coil portion) may be disposed inside the housing 700. The shielding portion 850 may include a first shielding portion 851, a second shielding portion 852, and a third shielding portion 853. In an embodiment, the first shielding portion 851 may have shape corresponding to the first coil 431. The second shielding portion 852 may have shape corresponding to the second coil 432. In an embodiment, a thickness of the second shielding portion 852 may be at least thicker than a thickness of the first shielding portion 851. In an embodiment, the second shielding portion 852 may be disposed inwardly in a radial direction of the first shielding portion 851. In an embodiment, the third shielding portion 853 may be disposed below the first shielding portion 851 and the second shielding portion 852.

The electronic device 401 according to various embodiments may include connecting terminals utilized to be electrically coupled to the TA 470 of FIG. 4. The connecting terminals may be provided at one side of the housing 700, and may be electrically coupled to circuits (e.g., the converting unit 460 of FIG. 4) included in the electronic device 401. For example, when the electronic device 401 and the TA 470 are electrically coupled through the connecting terminals, the TA 470 may be electrically coupled to the converting unit (460 of FIG. 4).

Figure 8:
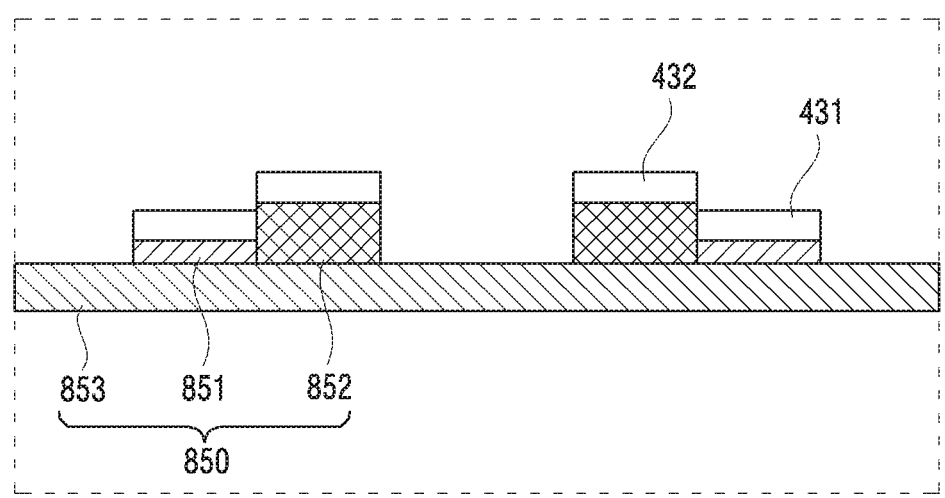
FIG. 8 briefly illustrates an arrangement structure of a first coil and second coil according to an embodiment of the disclosure.
Figure 9:
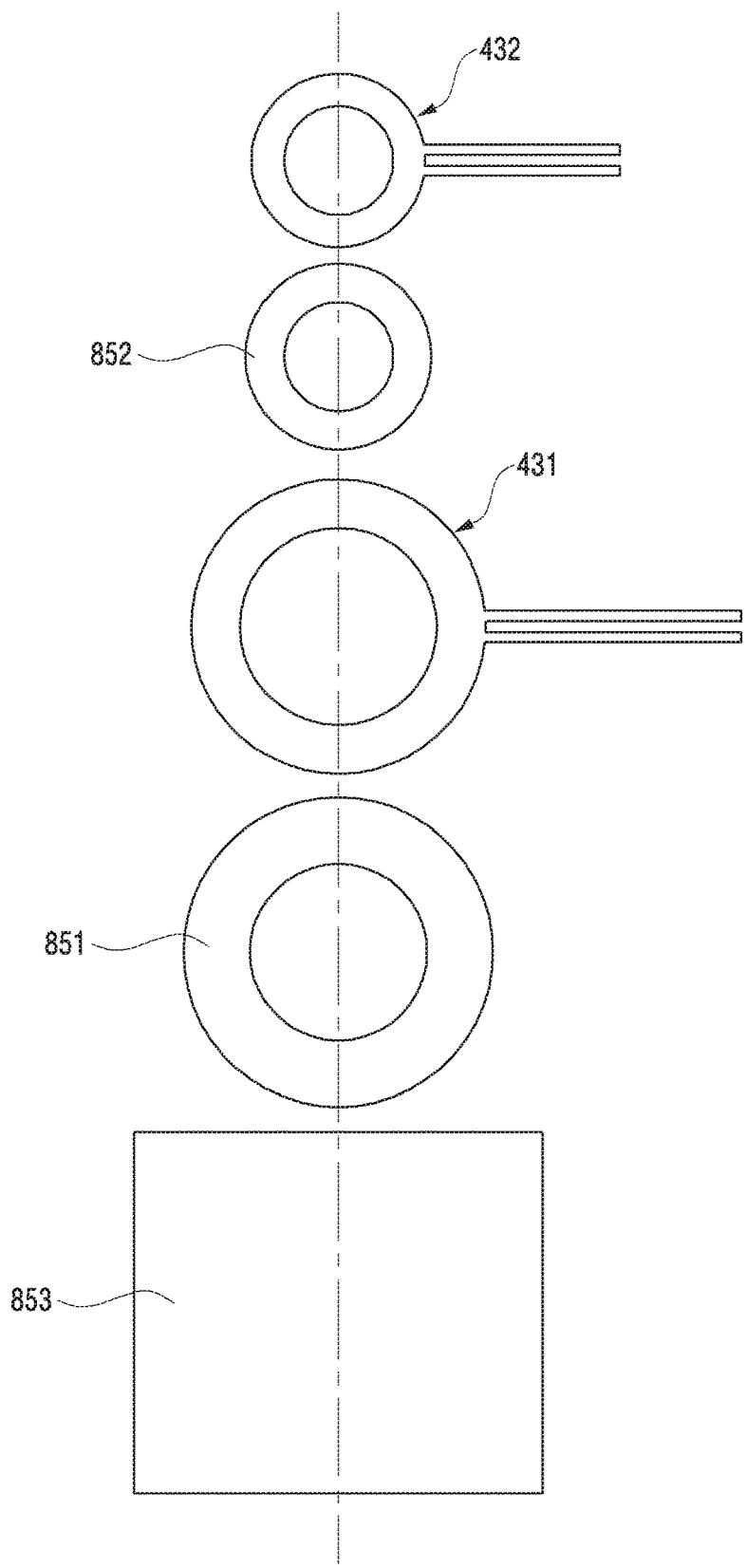
FIG. 9 briefly illustrates an arrangement structure of a first coil and second coil according to an embodiment of the disclosure.

FIGS. 8 and 9 briefly illustrate an arrangement structure of the first coil 431 and second coil 432 according to various embodiments of the disclosure.

Referring to FIGS. 8 and 9, an electronic device according to various embodiments may include the first coil 431. In various embodiments, the first coil 431 may be disposed at a location corresponding to the outer portion 720 of the housing 700, and the first coil 431 may be a transmitting coil for transmitting power to a first external electronic device (e.g., a smart phone). According to an embodiment, the first coil 431 may be disposed below a convex portion so as to correspond to the convex portion disposed to the outer portion 720. The first coil 431 may be disposed to have a height different from that of the second coil 432 for charging the second external electronic device (e.g., the smart watch 600 of FIG. 6). In an embodiment, a lower portion of the first coil 431 may be disposed at a lower location than a lower portion of the second coil 432. The first coil 431 may be disposed outwardly in a radial direction of the second coil 432. The first coil 431 may be disposed coaxially with the second coil 432, but is not limited thereto. In an embodiment, an inner face of the first coil 431 may be spaced apart from an outer face of the second coil 432, so that the first coil 431 and the second coil 432 do not overlap in a vertical direction. In an embodiment, the first shielding portion 851 may be disposed below the first coil 431. The additional second shielding portion 852 distinguished from the first shielding portion 851 may be disposed below the second coil 432. The third shielding portion 853 may be disposed below the first shielding portion 851 and the second shielding portion 852 and between there and the aforementioned board.

In various embodiments, the first coil 431 and the second coil 432 may be wound in various shapes. In an embodiment, the first coil 431 and the second coil 432 may be wound in the same shape. In another embodiment, the first coil 431 and the second coil 432 may be wound in different shapes. In an embodiment, at least one of the first coil 431 and the second coil 432 may have a substantially constant thickness and may be wound to have a circular cross-section. In an embodiment, at least one of the first coil 431 and the second coil 432 may have a substantially constant thickness and may be wound to have a rectangular cross-section. However, without being limited thereto, the coils may be wound in various shapes to transmit power wirelessly. In an embodiment, the second coil 432 may be disposed to an inner side in an axial direction of the first coil 431. In an embodiment, an outer face of the second coil 432 may be spaced apart from an inner face of the first coil 431. In various embodiments, the second coil 432 may be a transmitting coil for charging the second external electronic device (e.g., smart watch) 600. The second coil 432 may be disposed at a location corresponding to the concave portion 710. Accordingly, the receiving coil 640 of the smart watch mounted to the concave portion 710 and the second coil 432 which is the transmitting coil may be aligned. In addition, through the concave portion 710, heating can be avoided by minimizing a separation distance between the receiving coil of the smart watch 600 and the second coil 432, and charging efficiency can be increased. In addition, the second coil 432 may be disposed to have a height different from that of the first coil 431 for charging the first external electronic device. In an embodiment, the second coil 432 may be disposed at a higher location than the first coil 431. In an embodiment, a lower end of the second coil 432 may be disposed to be higher than a lower end of the first coil 431. In an embodiment, an upper end of the second coil 432 may be disposed to be higher than an upper end of the first coil 431. The second coil 432 may be disposed inwardly in a radial direction of the first coil 431. The second coil 432 and the first coil 431 may be coaxially disposed, but are not limited thereto. In an embodiment, the second coil 431 is disposed inwardly in a radial direction of the first coil 431, and an outer face of the second coil 432 is separated from an inner face of the first coil 431. Therefore, the first coil 431 and the second coil 432 may be disposed not to overlap in a vertical direction. However, there may be a spatial restriction since the second coil 432 is disposed inwardly in a radial direction of the first coil 431, and thus an inductance element may be coupled to a second power transmission circuit to compensate for inductance of the second coil 432. For example, the inductance element may include a lumped inductor. In an embodiment, the second shielding portion 852 may be disposed below the second coil 432. The second shielding portion 852 may perform a function of a spacer such that the second coil 432 is disposed to be higher than the first coil 431 at the same time of shielding a magnetic field of the second coil 432. Accordingly, the second shielding portion 852 may be disposed to be higher than the first coil 431. The third shielding portion 853 may be disposed below the second shielding portion 852 and between there and the board.

In various embodiments, the electronic device 401 may include a shielding portion (e.g., 850 of FIG. 7B). The shielding portion 850 may include a first shielding portion 851 disposed below the first coil 431 to shield a magnetic field of the first coil 431 and a second shielding portion 852 disposed below the second coil 432 to shield a magnetic field of the second coil 432. In an embodiment, the first shielding portion 851 may have a shape corresponding to a cross-section in which the first coil 431 is wound. In an embodiment, the second shielding portion 852 may have a shape corresponding to a cross-section in which the second coil 432 is wound. In various embodiments, the shielding portion 850 may be configured to block an electromagnetic field generated by the transmitting coil 430 including the first coil 431 and the second coil 432 from being transferred to a substrate. In addition, in an embodiment, the second shielding portion 852 disposed below the second coil 432 may serve as a spacer which allows the second coil 432 to be disposed at a height different from the first coil 431. In this case, the height of the second shielding portion 852 may have a higher height than the first coil 431. The shielding portion may be a non-conductive material, and in an embodiment, the first shielding portion 851 and the second shielding portion 852 may have the same or different permeability. In various embodiments, the shielding portion 850 may include a ferrite material, but is not limited thereto.

Figure 10:
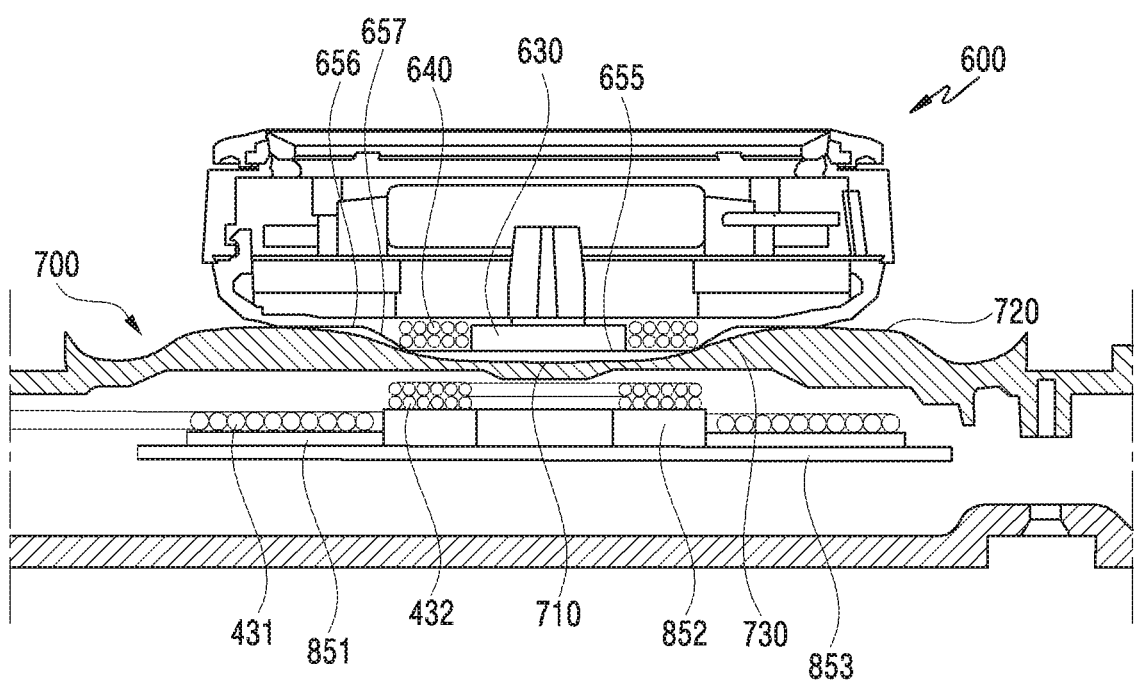
FIG. 10 is a cross-sectional view briefly illustrating a state in which the smart watch is mounted to a housing of an electronic device according to an embodiment of the disclosure.

FIG. 10 is a cross-sectional view briefly illustrating a state in which a second external electronic device (e.g., the smart watch 600) is mounted to the housing 700 of the electronic device 401 according to an embodiment of the disclosure.

Referring to FIG. 10, in various embodiments, the protrusion 655 of the second external electronic device 600 may be mounted to the concave portion 710 of the housing 700 for wireless charging of the second external electronic device 600. A gap in a vertical direction between the receiving coil 640 of the second external electronic device 600 and the second coil 432 of the housing 700 may be minimized. In an embodiment, charging efficiency may be increased since the receiving coil 640 and the second coil 432 are aligned by mounting the concave portion 710. In various embodiments, the receiving coil 640 may be disposed to a rear portion of a receiving device. In an embodiment, the receiving coil 640 of the second external electronic device 600 may be disposed to the protrusion 655, and may be disposed around the HRM sensor 630 of the protrusion 655. The receiving coil 640 may be disposed at a location corresponding to a vertical direction of the second coil 432.

In various embodiments, a region except for the protrusion 655 in the rear face of the second external electronic device 600 may be mounted to an outer portion 720 of the housing 700. A convex portion which is convex towards an external device may be disposed to an outer circumference of the concave portion 710 to smoothly align the receiving coil 640 and the transmitting coil. A region except for the protrusion 655 of the second external electronic device 600 may be mounted to the convex portion, and the protrusion 655 may align the receiving coil 640 and the second coil 432 inside the housing 700 to the concave portion 710 of the housing 700. In various embodiments, the first coil 431 may be disposed inside the outer portion 720 at a location corresponding to a vertical direction of the outer portion 720. In an embodiment, at least part of the first coil 431 may be disposed at a location corresponding to the outer portion 720. According to an embodiment, when the first external electronic device which is the external device is mounted to the first region 7051 of the housing 700, power may be transmitted to the first external electronic device through the first coil 431. In an embodiment, when the first external electronic device is mounted to the outer portion 720 disposed to the first region 7051 of the housing 700, the first external electronic device may be wirelessly charged through the first coil 431. Herein, although the first external electronic device mounted to the first region 7051 is described as a smart phone, without being limited thereto, various external electronic devices which can be distinguished from one another may be included by including a data packet different from that of the second external electronic device to which power is transmitted by the second coil.

In various embodiments, the first coil 341 and the second coil 342 may be disposed inside the housing 700. In an embodiment, the second coil 342 may be disposed coaxially with the first coil 341. In an embodiment, the second coil 342 may be disposed inside the first coil 341, and in this case, an outer face of the second coil 342 may be spaced apart from an inner face of the first coil 341. In an embodiment, the second coil 342 is disposed more inwardly than the inner face of the first coil 341. Therefore, an inductor size is restricted, and thus an inductance element (e.g., 420 of FIG. 11) may be further included to compensate for this.

In various embodiments, a printed circuit board (not shown) on which a power transmission circuit is constructed may be disposed inside the housing 700. Hereinafter, the printed circuit board may be referred to as a board. A shielding portion (e.g., 850 of FIG. 8) may be disposed above the board, and the first coil 431 and the second coil 432 may be disposed above the shielding portion 850. In various embodiments, the electronic device 401 may include a first shielding portion 851 disposed below the first coil 431 to shield a magnetic field of the first coil 431, and a second shielding portion 852 disposed below the second coil 432 to shield a magnetic field of the second coil 432. In an embodiment, the first shielding portion 851 may have a shape corresponding to a cross-section in which the first coil 431 is wound. In an embodiment, the second shielding portion 852 may have a shape corresponding to a cross-section in which the second coil 432 is wound. In various embodiments, the shielding portion 850 may be configured to block an electromagnetic field generated by the transmitting coil 430 including the first coil 431 and the second coil 432 from being transferred to a substrate. In addition, in an embodiment, the second shielding portion 852 disposed below the second coil 432 may serve as a spacer which allows the second coil 432 to be disposed at a height different from the first coil 431. The height of the second shielding portion 852 may have a higher height than the first coil 431. The shielding portion may be a non-conductive material, and in an embodiment, the first shielding portion 851 and the second shielding portion 852 may have the same or different permeability. In various embodiments, the shielding portion 850 may include a ferrite material, but is not limited thereto.

Figure 11:
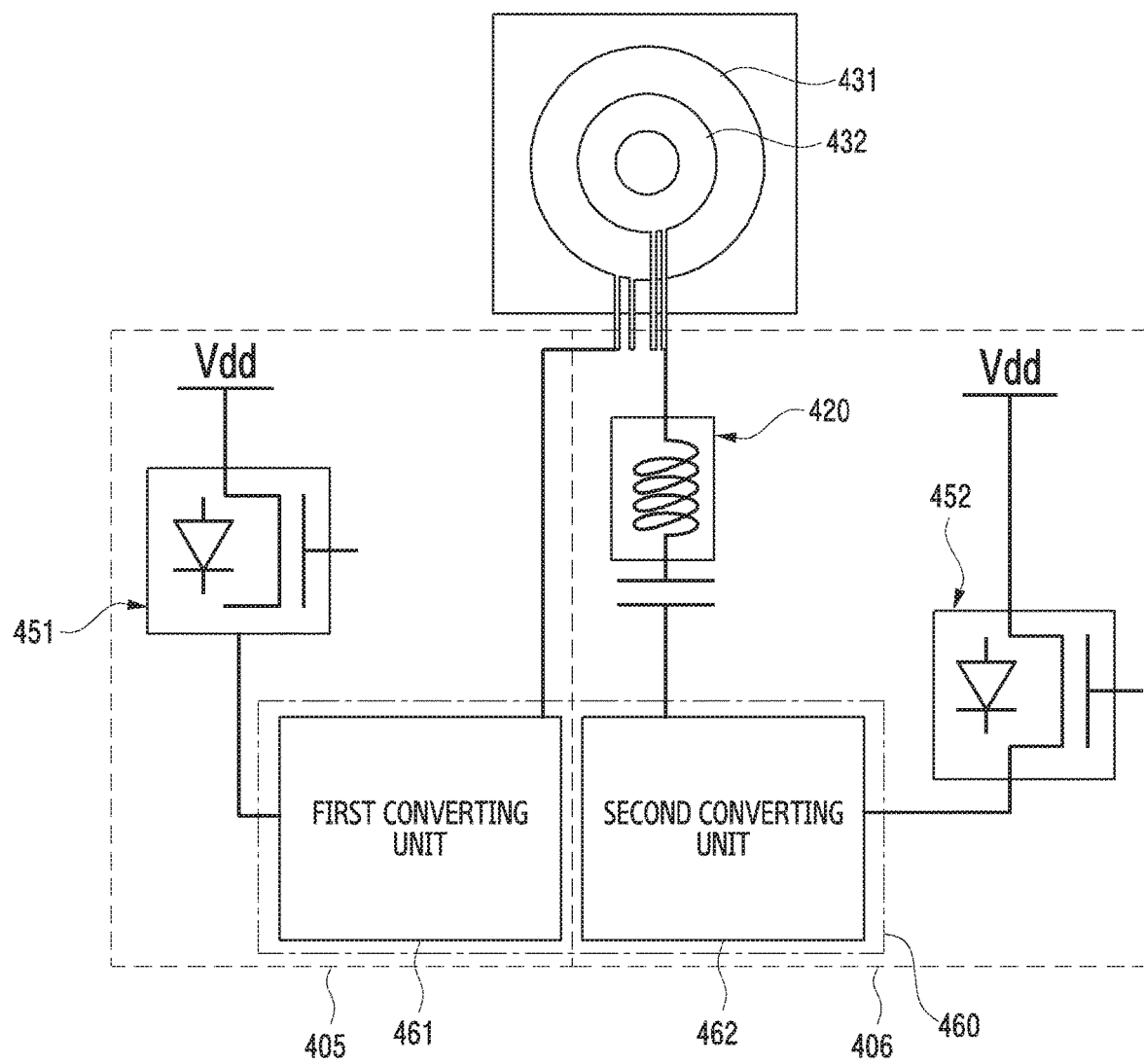
FIG. 11 briefly illustrates each structure of an electronic device according to an embodiment of the disclosure.

FIG. 11 briefly illustrates each structure of the electronic device 401 according to an embodiment of the disclosure.

Referring to FIG. 11, a coil according to various embodiments may include the first coil 431 and the second coil 432 to transmit power to a first external electronic device (e.g., a smart phone) and a second external electronic device (e.g., the smart watch 600 of FIG. 6). The first coil 431 and the second coil 432 may periodically transmit a specific signal (e.g., a digital ping signal) to identify an external electronic device (e.g., the first external electronic device and the second external electronic device). In response to the signal transmitted through each coil, a data packet received from an external device is analyzed to detect access of the external device corresponding to each coil. Upon detecting the access of the external device, a specific packet included in the external device is identified to wirelessly transmit power to a corresponding external device through each coil by means of a power transmission circuit by identifying the external device (e.g., identifying the second external electronic device corresponding to the second coil 432) corresponding to each of the coils 431 and 432.

In various embodiments, the first coil 431 may be wound with a first number of turns, and the second coil 432 may be wound with a second number of turns. In an embodiment, the first coil 431 may be disposed outwardly in a radial direction of the second coil 432. The first coil 431 may be disposed to be lower than the second coil 432. In an embodiment, the first coil 431 may be disposed coaxially with the second coil 432. The first coil 431 may be electrically coupled to the first power transmission circuit 405, and the second coil 432 may be electrically coupled to the second power transmission circuit 406. Each power transmission circuit may include the converting unit 460 for generating a wireless power signal to be output to the coil 430. The first power transmission circuit 405 may be coupled with the first current blocking circuit 451. In this case, the current blocking circuit 451 may be a P-type MOSFET. The current blocking circuit 451 may be coupled to a power input terminal of the first power transmission circuit 405.

In various embodiments, the second coil 432 may be wound with the second number of turns. In an embodiment, the second coil 432 may be disposed inwardly in a radial direction of the first coil 431. In an embodiment, an outer face of the second coil 432 may be spaced apart from an inner face of the first coil 431. In an embodiment, the second coil 432 may be disposed to be higher than the first coil 431. In an embodiment, a lower end of the second coil 432 may be disposed to be higher than a lower end of the first coil 431. The first coil 431 may be electrically coupled to the first power transmission circuit 405, and the second coil 432 may be electrically coupled to the second power transmission circuit 406. Each of the transmission power circuits 405 and 406 may include the converting unit 460 for generating a wireless power signal to be output to the coil unit 430. In an embodiment, the converting unit 460 may be implemented with an N-type MOSFET. The second power transmission circuit 406 may be coupled with the current blocking circuit 452. In this case, the current blocking circuit 452 may be a P-type MOSFET. The current blocking circuit 452 may be coupled to a power input terminal of the second power transmission circuit 406. In an embodiment, the second coil 432 may be constructed such that an outer diameter of the second coil 432 is smaller than an inner diameter of the first coil 431. Accordingly, due to a spatial limitation, it may be difficult to obtain a sufficient number of turns. Therefore, various embodiments of the disclosure may include the inductance element 420 in the second power transmission circuit 406 to compensate for inductance of the second coil 432. Herein, the inductance element 420 may include a lumped inductor.

In various embodiments, the first power transmission circuit 405 may be electrically coupled to the first coil 431 to transmit power to a corresponding external electronic device (e.g., a smart phone) through the first coil 431. In an embodiment, the first power transmission circuit 405 may include the first converting unit 461 for generating a wireless power signal to be output to the first coil 431. In an embodiment, the first converting unit 461 may be implemented with an N-type MOSFET. In another embodiment, the first power transmission circuit 405 may be coupled with a first current blocking circuit 451. The first current blocking circuit 451 may be a P-type MOSFET. The first current blocking circuit may be coupled to a power input terminal of the first power transmission circuit 405.

In various embodiments, the second power transmission circuit 406 may be electrically coupled to the second coil 432 to transmit power to a corresponding external electronic device (e.g., the smart watch 600) through the second coil 432. In an embodiment, the second power transmission circuit 406 may include the second converting unit 462 for generating a wireless power signal to be output to the second coil 432. In an embodiment, the second converting unit 462 may be implemented with an N-type MOSFET. In another embodiment, the second power transmission circuit 406 may be coupled with a second current blocking circuit 452. The second current blocking circuit 452 may be implemented with a P-type MOSFET. The second current blocking circuit 452 may be coupled to a power input terminal of the second power transmission circuit 406. In an embodiment, the second coil 432 may be constructed such that an outer diameter of the second coil 432 is smaller than an inner diameter of the first coil 431. Accordingly, due to a spatial limitation, it may be difficult to obtain a sufficient number of turns. Therefore, various embodiments of the disclosure may include the inductance element 420 in the second power transmission circuit 406 to compensate for inductance of the second coil 432. For example, the inductance element 420 may include a lumped inductor.

Figure 12:
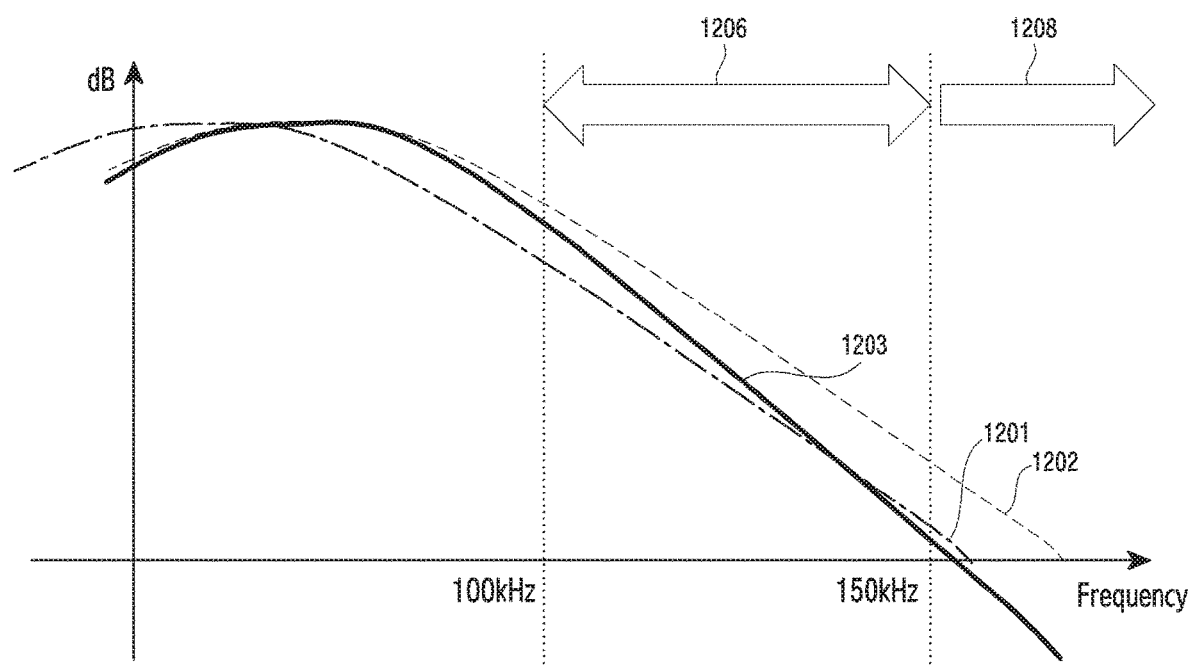
FIG. 12 illustrates a change in a slope of a frequency curve for power control when a lumped inductor is implemented in a second power transmission circuit coupled to a second coil of an electronic device in various embodiments according to an embodiment of the disclosure.

FIG. 12 illustrates a change in a slope of a frequency curve for power control when a lumped inductor is implemented in the second power transmission circuit 406 coupled to the second coil 432 of the electronic device 401 according to an embodiment of the disclosure.

Referring to FIG. 12, a graph 1201 of FIG. 12 may be a power-frequency curve when a resonance frequency of the second coil 432 is set to, for example, 75 kHz, and a graph 1202 may be a power-frequency curve when a resonance frequency of the second coil 432 is set to, for example, 87 kHz by adjusting capacitance of the second coil 432.

Charging power control of a wireless charging device according to various embodiments may be achieved by controlling an operating frequency (e.g., about 110 kHz to 148 kHz) in operating frequency region 1206 and, upon reaching an upper limit frequency (e.g., 148 kHz), by controlling a duty rate in region 1208. In this case, an electromagnetic interference (EMI) may occur in the process of controlling the duty rate. Returning to FIG. 12, in the wireless charging device according to various embodiments, for example, when the lumped inductor (e.g., the inductance element 420) is implemented in the second coil 432, a Y-axis range is increased in an operating frequency region (e.g., about 110 kHz to 148 kHz) due to an increase in the slope of the power-frequency curve 1203 for power control, and thus fine power control may be possible. In addition, since an unnecessary duty rate control is not required in case of a low load, EMI and heating performance can be improved. In addition, in an embodiment, since a ratio for the number of turns of the second coil 432 which overlaps with the first coil 431 can be decreased by implementing a lumped inductor in the second power transmission circuit coupled to the second coil 432, leakage current which is mutually induced between the first coil 431 and the second coil 432 may be decreased.

Figure 13:
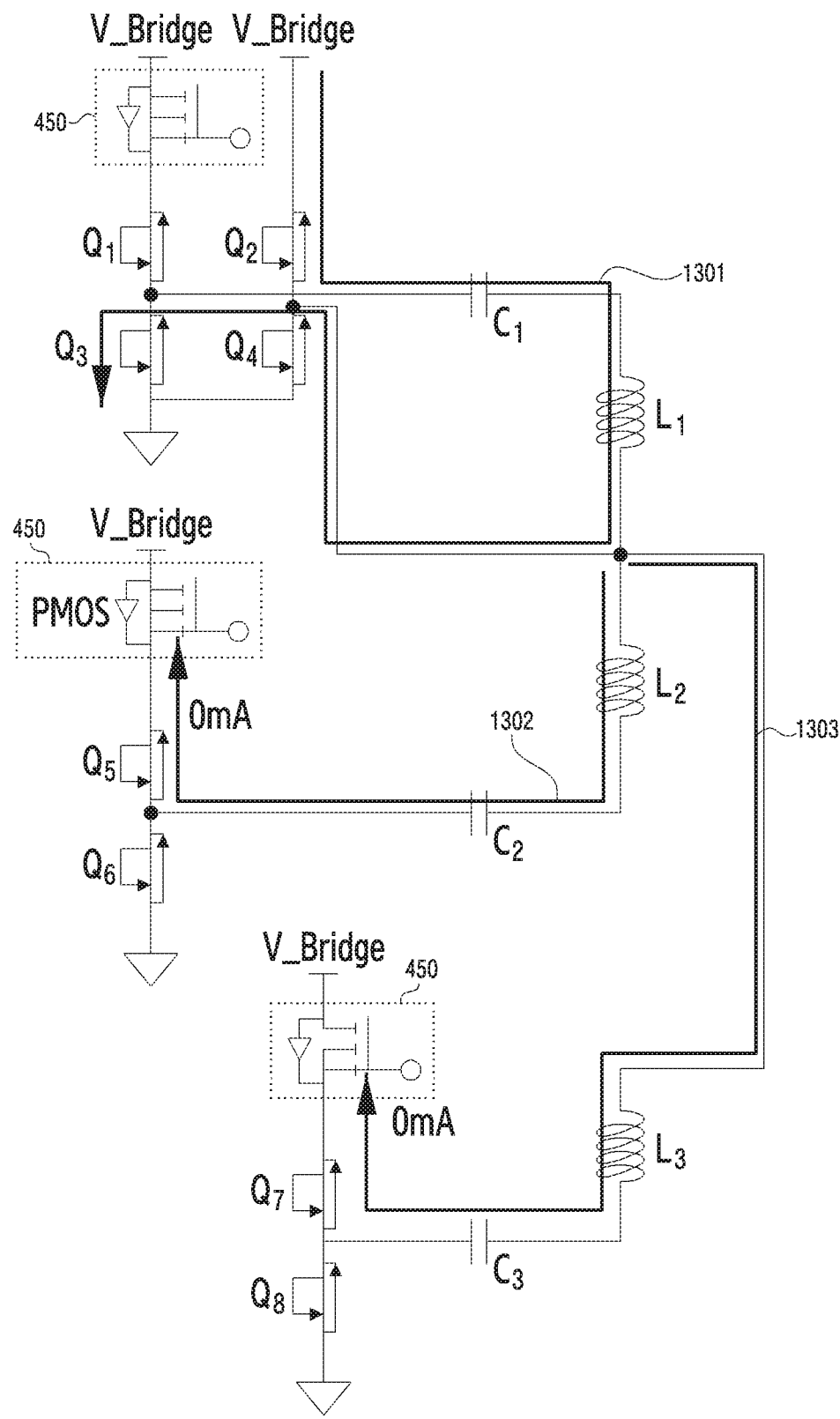
FIG. 13 is a diagram for briefly explaining an arrangement of a current blocking circuit according to an embodiment of the disclosure.
Figure 14A:
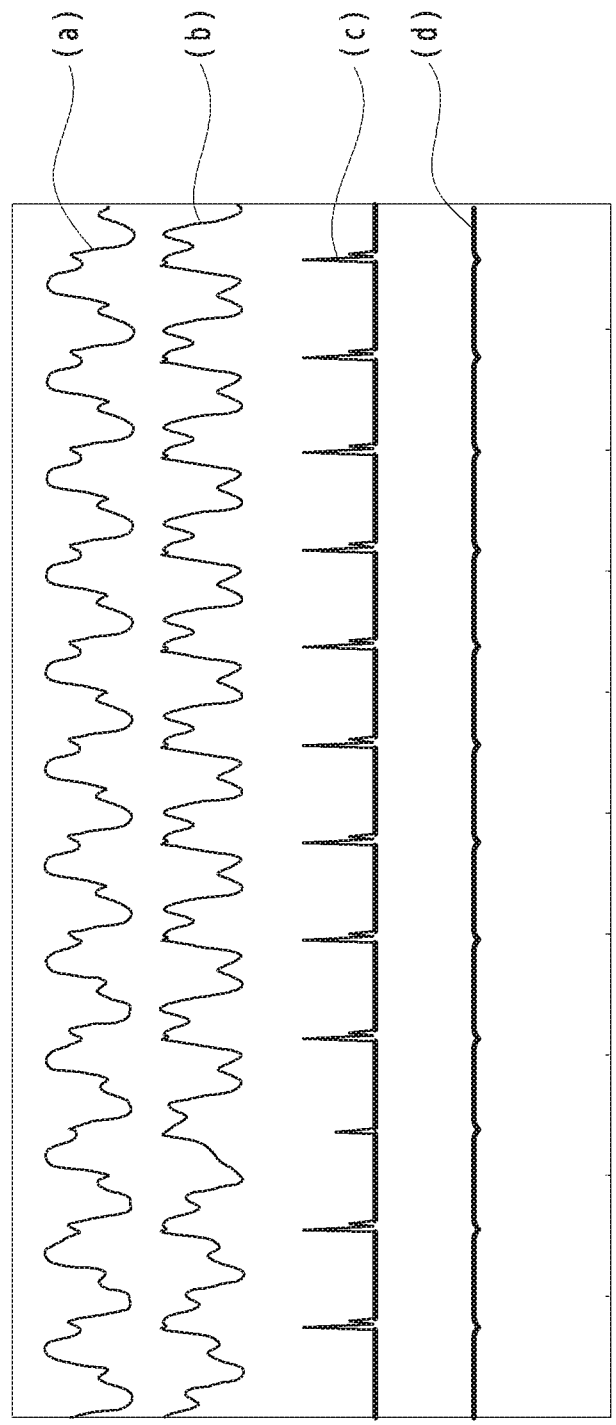
FIG. 14A is a diagram for briefly explaining a reverse current flow in a power transmission circuit in which charging is not achieved through a configuration of a current blocking circuit according to an embodiment of the disclosure.
Figure 14B:
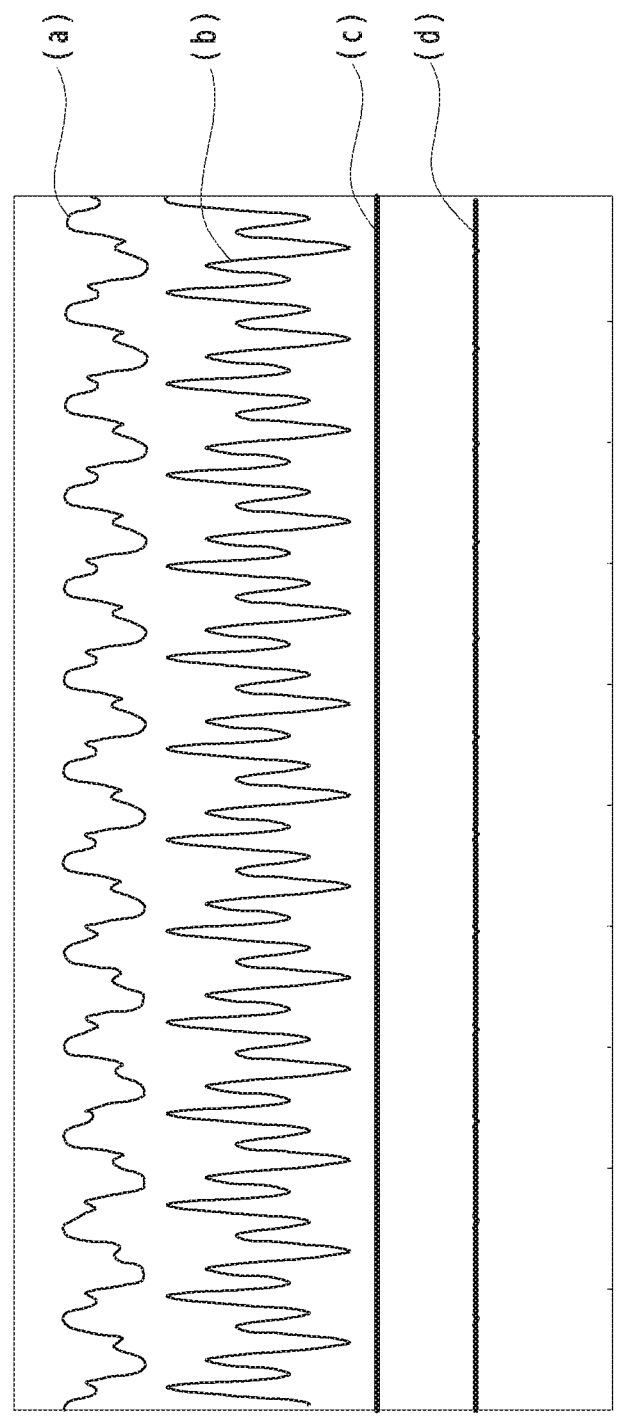
FIG. 14B is a diagram for briefly explaining a reverse current flow in a power transmission circuit in which charging is not achieved through a configuration of a current blocking circuit according to an embodiment of the disclosure.

FIG. 13 is a diagram for briefly explaining an arrangement of the current blocking circuit 450 according to an embodiment of the disclosure, and FIGS. 14A and 14B are diagrams for briefly explaining a reverse current flow in a power transmission circuit in which charging is not achieved through a configuration of the current blocking circuit according to various embodiments.

Referring to FIG. 13, the power transmission circuit 400 according to various embodiments may include a plurality of power transmission circuits 1301, 1302, and 1303. In various embodiments, the current blocking circuit 450 for blocking reverse current caused by leakage current which is mutually inducted between the first coil 431 and the second coil 432 may be disposed to at least one power input terminal of each of the power transmission circuits 1301, 1302, and 1303. In an embodiment, the current block circuit 450 may be implemented with a P-MOSFET.

A graph (a) of FIG. 14A and FIG. 14B illustrates a voltage or current flow of the first coil 431 in wireless charging of a first external electronic device (e.g., a smart phone) according to an embodiment of the disclosure, and a graph (b) illustrates a voltage or current flow of the second coil 432 corresponding to a second external electronic device (e.g., the smart watch 600) in charging of the first external electronic device according to an embodiment. A graph (c) illustrates reverse current at a power input terminal of the second coil 432, and a graph (d) illustrates voltage V_bridge applied to a converting unit of a second power transmission circuit corresponding to a second external electronic device.

Referring to FIG. 14A, when power is transmitted through the first power transmission circuit 405 coupled to the first coil 432 to charge the first external electronic device, due to current of the first power transmission circuit 405, reverse current may flow to the second power transmission circuit 406 of the second coil 432 disposed adjacent thereto, caused by leakage current of the first coil 431. In this case, the second converting unit 462 may be an inverter implemented with an N-MOSFET. In this case, if a voltage difference between a source and drain of the N-MOSFET of the converting unit is greater than, for example, 0.7V, reverse current may be generated in the second power transmission circuit 406 as shown in the graph (c), and reverse current may be introduced to a power input terminal.

Referring to FIG. 14B, because of the second current blocking circuit 452 (e.g., P-MOSFET) disposed to the power input terminal of the second power transmission circuit 406 according to an embodiment, when power is transmitted through the first coil 431, reverse current generated in the second coil 432 due to leakage current may be blocked by the current blocking circuit 452.

Hereinafter, a method of operating the electronic device 401 is described according to various embodiments. The electronic device 401 according to various embodiments may operate by including a wireless charging technique defined in a wireless charging technique standard organization, that is, wireless power consortium (WPC) and power matters alliance (PMA).

Figure 15:
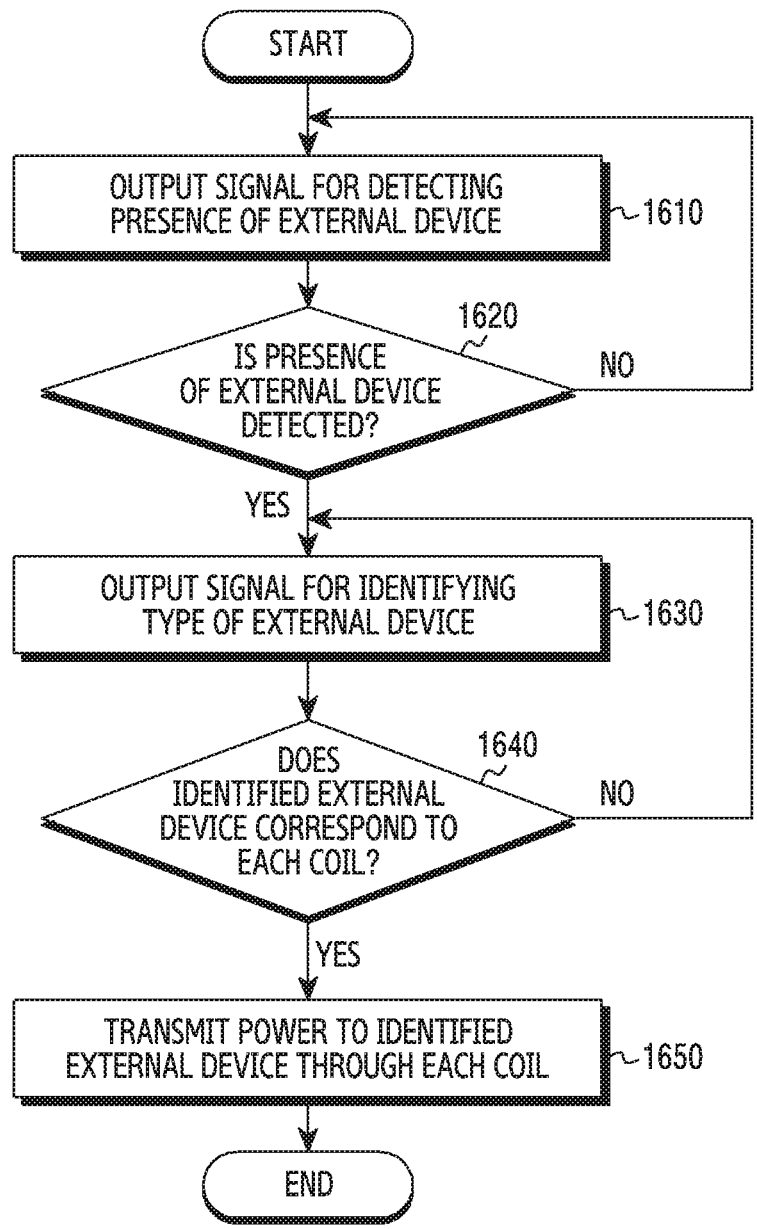
FIG. 15 is an operational flowchart of an electronic device according to an embodiment of the disclosure.
Figure 16:
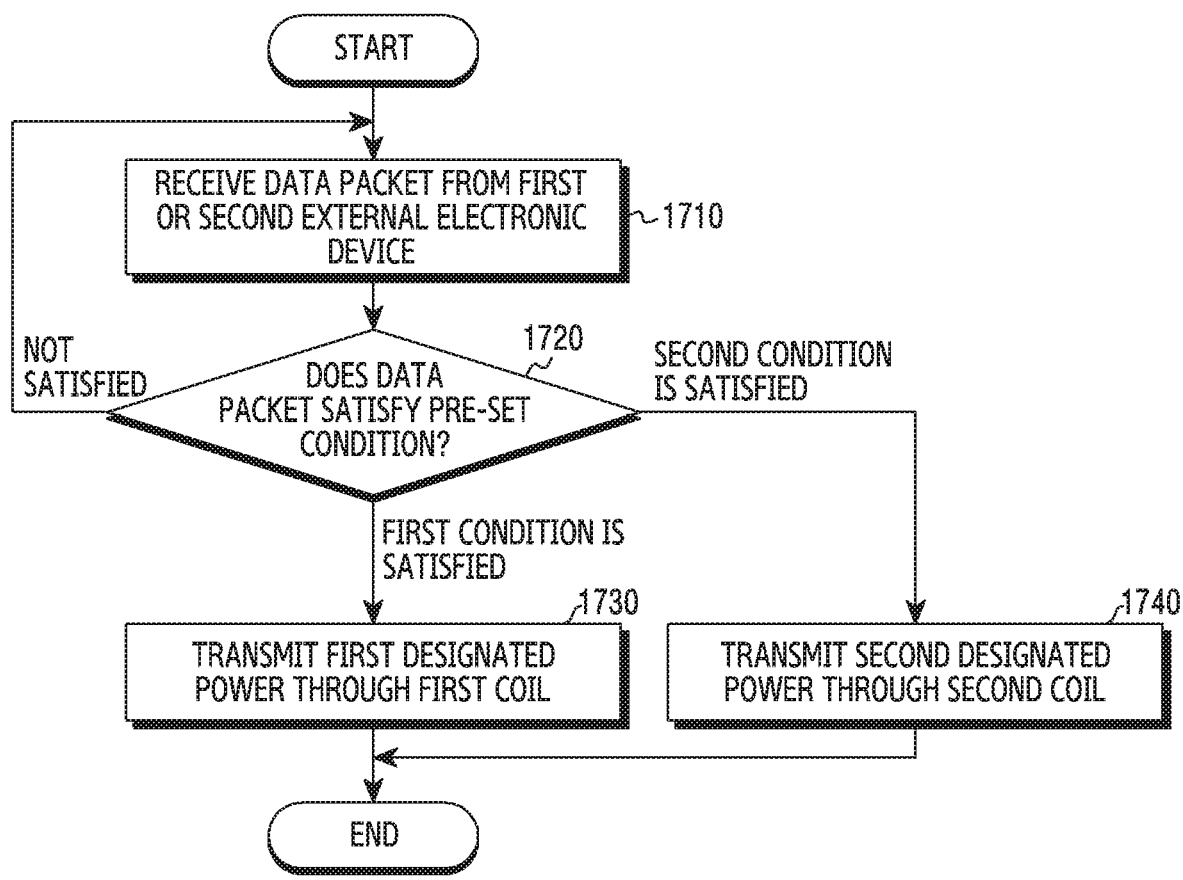
FIG. 16 is an operational flowchart of an electronic device according to an embodiment of the disclosure.
Figure 17:
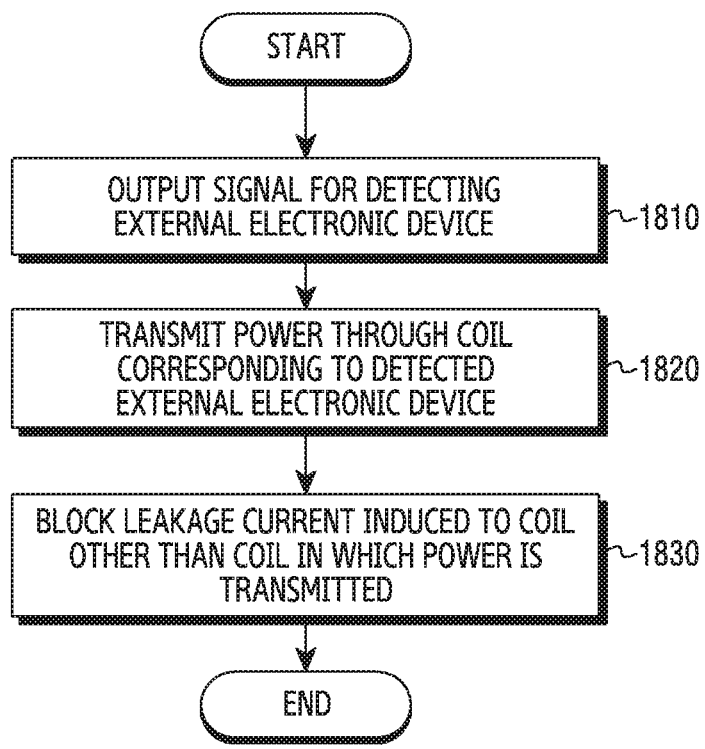
FIG. 17 is an operational flowchart of an electronic device according to an embodiment of the disclosure.

FIGS. 15, 16, and 17 are operational flowcharts of the electronic device 401 according to various embodiments of the disclosure.

Referring to FIGS. 4 and 10 described above, together with reference to FIG. 15, the electronic device 401 may include the housing 700 including the concave portion 710 and the first coil 431 and second coil 432 which are housed inside the housing 700 to have different heights and which transmit power wirelessly to different external electronic devices (e.g., a first external electronic device and a second external electronic device). The electronic device 401 may include an operation of outputting a signal for identifying the first external electronic device and the second external electronic device and an operation of transmitting power through a coil corresponding to the first coil 431 or the second coil 432. In the power transmission operation, it is possible to reduce or block leakage current induced to the remaining coil by the coil for transmitting power out of the first coil 431 and second coil 432 from being introduced to the power input terminal by the current blocking circuit 450.

The method of operating the electronic device 401 according to various embodiments may include an operation of outputting a signal for detecting an external electronic device (e.g., the smart watch 600).

In various embodiments, the operation of outputting the signal may include operations 1610 and 1620 for detecting the presence of an external electronic device mounted to the charging face 705 of the housing 700 and operations 1630 and 1640 for identifying a type of the external electronic device 102. In the operation of detecting the presence of the external electronic device in various embodiments, for example, the signal processing unit 440 may transmit a ping signal to the external electronic device at operation 1610, and the control circuit 410 may detect the presence of the external device on the basis of corresponding detected current and capacitance change (1620). In another embodiment, the signal processing unit 440 may periodically transmit a searching signal or a beacon to the external device at operation 1610. In response thereto, the external electronic device transmits a response signal or a searching signal to the electronic device 401, and thus the control circuit 410 may detect whether the external electronic devices has access thereto at operation 1620. Upon detecting the presence of the external electronic device, in the operation of detecting a type of the external electronic device, the signal processing unit 440 may transmit an identifying signal to detect the type of the external electronic device through each transmitting coil of the first coil 431 and second coil 432 at operation 1630. In this case, the identifying signal may be a digital ping signal. Each of the transmitting coils 431 and 432 may simultaneously or alternately transmit the digital ping signal. In an embodiment, the identifying signal may be transmitted through an antenna device (not shown) coupled to each coil. In this case, the identifying signal may be continuously transmitted while the external electronic device is present. Upon receiving the identifying signal, the external electronic device may transmit to the antenna device or the transmitting coil of the electronic device 401 a specific corresponding signal including a data packet included in each external device in response to the received signal. A variety of information of the external device may be identified by receiving a data packet through the corresponding signal of the external device (e.g., a packet for selecting a charging coil, a type of the external device, required power, charging capacity, etc.).

The electronic device 401 may identify an external electronic device corresponding to each of the coils 431 and 432 out of external devices near the charging face 705 of the housing 700 through the operation of identifying the external device corresponding to each of the coils 431 and 432. As described above, a receiving device corresponding to each of the first coil 431 and the second coil 432 may be identified by receiving the data packet including the variety of information of each receiving device and by analyzing this in the control circuit 410.

In various embodiments, the electronic device 401 may transmit power wirelessly to each receiving device through a corresponding coil upon identifying that a receiving device mounted to each region of the housing 700 corresponding to each coil is a receiving device corresponding to each of the first coil 431 and the second coil 432 at operation 1650. In an embodiment, upon identifying that the external device mounted to the first region 7051 of the housing 700 corresponding to the first coil 431 is a first external electronic device (e.g., a smart phone), the control circuit 410 may transmit power to the first external electronic device through the first coil 431. In an embodiment, upon identifying that the external device mounted to the second region 7052 of the housing 700 corresponding to the second coil 432 is a second external electronic device (e.g., the smart watch 600), the control circuit may transmit power to the second external electronic device 600 through the second coil 432. In an embodiment, the second external electronic device 600 may be mounted to the concave portion 710 disposed to the second region 7052 of the housing 700. In this case, since the protrusion 655 disposed to a rear face of the second external electronic device 600 is mounted to the concave portion 710, the second coil 432 and the receiving coil 640 of the smart watch 600 may be in proximity. In an embodiment, since the protrusion 655 disposed to the rear face of the second external electronic device 600 is mounted to the concave portion 710, the second coil 432 and the receiving coil 640 of the smart watch 600 may be aligned.

In various embodiments, in operation 1650 for transmitting power to the external device, if the result of identifying the data packet received from the external device shows that a first condition is satisfied (e.g., if a type of the external device is identified as the first external electronic device), first power for charging the first external electronic device may be transmitted. In various embodiments, if the result of identifying the data packet received from the external device shows that a second condition is satisfied (e.g., if the type of the external device is identified as the second external electronic device 600), second power distinguished from the first power may be transmitted to charge the second external electronic device 600. In this case, the first power and the second power may be pre-set power for charging respective corresponding external devices.

In an embodiment, the second coil 432 may compensate for inductance through the inductance element 420 coupled to the second power transmission circuit 406. Power control of the wireless charging device may be achieved by controlling an operating frequency, and upon reaching an upper limit frequency as the external device reaches a full charging state, control of charging power may be achieved by controlling a duty rate. According to an embodiment, as shown in FIG. 12, the inductance element 420 may be a lumped inductor, and the lumped inductor may be coupled to the second coil 432 to increase a slope of a power-frequency curve. Therefore, for example, a Y-axis (power) range can be widen in a range of 110 kHz to 14 kHz as a frequency operating section for power control, and fine power control becomes possible, which may lead to improvement in a control feature of charging power. Further, unnecessary duty rate control can be decreased in case of a low load, thereby minimizing EMI and heating. That is, as shown in FIG. 12, through inductance combination of the second coil and the lumped inductor, it is possible to increase the slope of the power-frequency curve, increase a frequency range for power control, and decrease a ratio for the number of turns of the second coil 432 which may overlap with the first coil 431, thereby decreasing leakage current mutually induced between the first coil 431 and the second coil 432.

In an embodiment, the current blocking circuit 450 may be included in the power input terminal of the first and/or second power transmission circuit. In an embodiment, the current blocking circuit 450 may be implemented with a P-MOSFET. In the aforementioned power transmission operation S1500, if power is transmitted through any one of the first coil 431 and the second coil 432, leakage current is induced to a coil which does not transmit power, and thus reverse current may flow to a power transmission circuit which does not transmit power. For example, as shown in FIG. 14A, if a voltage difference between a source and drain of a converting unit implemented with an N-MOSFET is greater than specific voltage (e.g., 0.7V), reverse current may flow to an adjacent power transmission circuit. In an embodiment, as shown in FIG. 14B, by coupling the current blocking circuit 450 implemented with the P-MOSFET to a power input terminal of the adjacent power transmission circuit in a state where power is not transmitted, induced current can be blocked from being introduced to the power input terminal by using the current blocking circuit 450.

Referring to FIG. 16, an electronic device according to various embodiments may receive a signal including a packet for selecting a charging coil from each external electronic device, in response to a ping signal transmitted to different external electronic devices (e.g., a first external electronic device and a second external electronic device at operation 1710. The control circuit 410 may analyze a data packet through the signal received from each external electronic device, and may determine whether at least part of information included in the data packet satisfies a specific condition at operation 1720. In this case, the specific condition may be a pre-set condition corresponding to each external electronic device. If the determination result shows that the data packet satisfies a first condition corresponding to the first external electronic device, first designated power may be transmitted to the first external electronic device through the first coil at operation 1730. In an embodiment, if the data packet satisfies a second condition, second designated power may be transmitted to the second external electronic device through the second coil at operation 1740.

Referring to FIG. 17, an electronic device according to various embodiments may output a specific signal for an external electronic device including different data packets at operation 1810. If a detected external electronic device is identified as an external electronic device corresponding to any one of the coils 431 and 432, power may be transmitted to the detected external electronic device through a corresponding coil at operation 1820. According to an embodiment, leakage current may be induced to a coil in which power is not transmitted through a coil in which power is transmitted out of the first coil 431 and the second coil 431, and leakage current can be blocked from being introduced to a power input terminal through the current blocking circuit 450 coupled to the power input terminal at operation 1830.

According to various embodiments, an electronic device may include a housing constructing an exterior of the electronic device and including a concave portion couplable to a protrusion of some external electronic devices at the exterior among a plurality of external electronic devices, a first coil stored inside the housing and wound with a first number of turns, a second coil stored inside the housing, wound with a second number of turns, and disposed between the first coil and the concave portion, a power transmission circuit including a first connecting terminal electrically coupled to the first coil and a second connecting terminal electrically coupled to the second coil, and a control circuit. The control circuit may be configured to check a data packet received from the external electronic device which is in proximity to the electronic device, transmit first designated power to the external electronic device through the first coil wirelessly by using the power transmission circuit if the data packet satisfies a first condition, and transmit second designated power to the external electronic device through the second coil wirelessly by using the power transmission circuit if the data packet satisfies a second condition.

In various embodiments, the second coil may be constructed at a location corresponding to the concave portion, and may be disposed to be higher than the first coil.

In various embodiments, the second coil may be disposed inwardly in a radial direction of the first coil, and an outer diameter of the second coil may be smaller than an inner diameter of the first coil.

In various embodiments, the power transmission circuit may include a third coil which compensates for inductance of the second coil.

In various embodiments, the power transmission circuit may include a first power transmission circuit including the first connecting terminal and a second power transmission circuit including a second connecting terminal, and may include a blocking switch coupled to respective power source terminals of the first and second power transmission circuits to block reverse current.

In various embodiments, the blocking switch may include a P-type MOSFET.

According to various embodiments, an electronic device may include a housing including a charging face facing different external devices, a coil unit stored inside the housing and including a first coil and a second coil which transmit power respectively for the different external devices, and a shielding portion disposed below the coil unit. The second coil may be disposed to be higher at least in part than a lower end of the first coil.

In various embodiments, the second coil may be disposed coaxially with the first coil.

In various embodiments, an outer diameter of the second coil may be smaller than an inner diameter of the first coil.

In various embodiments, the shielding portion may further include a first shielding portion disposed below the first coil and a second shielding portion disposed below the second coil. A thickness of the second shielding portion may be thicker than a thickness of the first shielding portion.

In various embodiments, the shielding portion may include a ferrite material.

In various embodiments, the housing may include a concave portion disposed to be concave towards the second coil at a location corresponding to the second coil of the charging face.

In various embodiments, the charging face may include a convex portion disposed to correspond to the first coil at an outer circumference of the concave portion.

In various embodiments, the first coil may transmit power to the first external device out of the different external devices, and the second coil may transmit power to the second external device which is distinguished from the first external device.

In various embodiments, the first coil and the second coil may be wound with different numbers of turns.

In various embodiments, the electronic device may further include a first power transmission circuit electrically coupled to the first coil and a second power transmission circuit electrically coupled to the second coil. The second power transmission circuit may further include an inductance element electrically coupled to the second coil.

In various embodiments, the inductance element may include a lumped inductor.

In various embodiments, the electronic device may include a current blocking circuit electrically coupled to a power input terminal of at least any one of the first power transmission circuit or the second power transmission circuit.

In various embodiments, the current blocking circuit may include a P-MOSFET.

According to various embodiments, a method of operating an electronic device is provided. The electronic device may include a housing including a concave portion and a first coil and second coil which are housed inside the housing to have different heights and which wirelessly transmit power for different external electronic devices. The method may include outputting a signal for detecting the first external device or the second external device, and transmitting power through a corresponding coil out of the first coil or the second coil with respect to the detected external electronic device. The power transmission operation may block leakage current induced to the remaining coil from being introduced to a power input terminal due to a coil which transmits power out of the first or second coils.

An electronic device according to various embodiments may include a housing constructing an exterior of the electronic device and including a concave portion couplable to a protrusion of some external electronic devices at the exterior among a plurality of external electronic devices, a first coil housed inside the housing and wound with a first number of turns, a second coil housed inside the housing, wound with a second number of turns, and disposed between the first coil and the concave portion, a power transmission circuit including a first connecting terminal electrically coupled to the first coil and a second connecting terminal electrically coupled to the second coil, and a control circuit. The control circuit may be configured to check a data packet received from the external electronic device which is in proximity to the electronic device, transmit first designated power to the external electronic device through the first coil wirelessly by using the power transmission circuit if the data packet satisfies a first condition, and transmit second designated power to the external electronic device through the second coil wirelessly by using the power transmission circuit if the data packet satisfies a second condition.

In various embodiments, the second coil may be constructed at a location corresponding to the concave portion, and may be disposed to be higher than the first coil.

In various embodiments, the second coil may be disposed inwardly in a radial direction of the first coil, and an outer diameter of the second coil may be smaller than an inner diameter of the first coil.

In various embodiments, the power transmission circuit may include a third coil which compensates for inductance of the second coil.

In various embodiments, the power transmission circuit may include a first power transmission circuit including the first connecting terminal and a second power transmission circuit including a second connecting terminal, and may include a blocking switch coupled to respective power source terminals of the first and second power transmission circuits to block reverse current.

In various embodiments, the blocking switch may include a transistor for blocking a path of current.

In various embodiments, an electronic device may include a housing including a charging face facing a first external device or a second external device, a coil unit stored inside the housing and including a first coil which transmits power for the first external device and a second coil which transmits power for the second external device, and a shielding portion disposed below the coil unit. The second coil may be disposed to be higher at least in part than a lower end of the first coil.

In various embodiments, the second coil may be disposed coaxially with the first coil.

In various embodiments, an outer diameter of the second coil may be smaller than an inner diameter of the first coil.

In various embodiments, the shielding portion may further include a first shielding portion disposed below the first coil and a second shielding portion disposed below the second coil. A thickness of the second shielding portion may be thicker than a thickness of the first shielding portion.

In various embodiments, the shielding portion may include a ferrite material.

In various embodiments, the housing may include a concave portion disposed to be concave towards the second coil at a location corresponding to the second coil of the charging face.

The charging face may include a convex portion disposed to correspond to the first coil at an outer circumference of the concave portion.

In various embodiments, the first coil may transmit power to the first external device, and the second coil may transmit power to the second external device which is distinguished from the first external device.

In various embodiments, the first coil and the second coil may be wound with different numbers of turns.

In various embodiments, the electronic device may further include a first power transmission circuit electrically coupled to the first coil and a second power transmission circuit electrically coupled to the second coil. The second power transmission circuit may further include an inductance element electrically coupled to the second coil.

In various embodiments, the inductance element may include a lumped inductor.

In various embodiments, the electronic device may include a current blocking circuit electrically coupled to a power input terminal of at least any one of the first power transmission circuit or the second power transmission circuit.

In various embodiments, the current blocking circuit may include a set of transistors for blocking a path of current.

According to various embodiments, a method of operating an electronic device is provided. The electronic device may include a housing including a concave portion, a first coil which transmits power for a first external device, and a second coil disposed coaxially with the first coil to transmit power for a second external device, wherein the first coil and the second coil are stored inside the housing to have different heights. The method may include outputting a signal for detecting the first external device or the second external device, and transmitting power through a corresponding coil out of the first coil or the second coil with respect to the detected external electronic device. The power transmission operation may block leakage current induced to the remaining coil from being introduced to a power input terminal due to a coil which transmits power out of the first coil or the second coil.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a ROM, an electrically erasable programmable ROM (EEPROM), a magnetic disc storage device, a CD-ROM, digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can have an access to a device for performing an embodiment of the disclosure via an external port. In addition, an additional storage device on a communication network can have an access to the device for performing the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims.

What is claimed is:
1. An electronic device comprising:
a housing forming an exterior of the electronic device, the housing including a concave portion couplable to a protrusion of one or more external electronic devices, among a plurality of external electronic devices at the exterior of the electronic device;
a first coil stored inside the housing disposed at a first height and wound with a first number of turns;
a second coil stored inside the housing, wound with a second number of turns, and disposed at a second height, which is higher than the first height, radially inward between the first coil and the concave portion, wherein the first coil and the second coil are located corresponding to the concave portion, and the second coil is closer to the concave portion than the first coil;
a power transmission circuit comprising a first connecting terminal electrically coupled to the first coil, and a second connecting terminal electrically coupled to the second coil; and
a control circuit configured to:
check a data packet received from the external electronic device which is in proximity to the electronic device,
transmit first designated power to the external electronic device through the first coil wirelessly by using the power transmission circuit if the data packet satisfies a first condition, and
transmit second designated power to the external electronic device through the second coil wirelessly by using the power transmission circuit if the data packet satisfies a second condition.
2. The electronic device of claim 1, wherein the second coil is constructed at a location corresponding to the concave portion, and is disposed to be higher than the first coil.
3. The electronic device of claim 2, wherein the second coil is disposed inwardly in a radial direction of the first coil, and an outer diameter of the second coil is smaller than an inner diameter of the first coil.
4. The electronic device of claim 1, wherein the power transmission circuit comprises a third coil which compensates for inductance of the second coil.
5. The electronic device of claim 1,
wherein the power transmission circuit comprises:
a first power transmission circuit including the first connecting terminal, and
a second power transmission circuit including a second connecting terminal, and
wherein the electronic device further comprises a blocking switch coupled to respective power source terminals of the first and second power transmission circuits to block reverse current.
6. The electronic device of claim 5, wherein the blocking switch comprises a transistor for blocking a path of current.
7. An electronic device comprising:
a housing including a charging face facing a first external device or a second external device;

a coil unit stored inside the housing, the coil unit including a first coil disposed at a first height to transmit power for the first external device, and a second coil disposed radially inward from the first coil, at a second height which is higher than the first height, to transmit power for the second external device; and a shielding portion disposed below the coil unit, wherein at least a part of the second coil is disposed to be higher than a lower end of the first coil.

8. The electronic device of claim 7, wherein the second coil is disposed coaxially with the first coil.

9. The electronic device of claim 8, wherein an outer diameter of the second coil is smaller than an inner diameter of the first coil.

10. The electronic device of claim 8, wherein the shielding portion comprises a first shielding portion disposed below the first coil, and a second shielding portion disposed below the second coil, and wherein a thickness of the second shielding portion is thicker than a thickness of the first shielding portion.

11. The electronic device of claim 10, wherein the shielding portion comprises a ferrite material.

12. The electronic device of claim 7, wherein the housing comprises a concave portion disposed to be concave towards the second coil at a location corresponding to the second coil of the charging face.

13. The electronic device of claim 12, wherein the charging face comprises a convex portion disposed to correspond to the first coil at an outer circumference of the concave portion.

14. The electronic device of claim 7, wherein the first coil transmits power to the first external device, and wherein the second coil transmits power to the second external device which is distinguished from the first external device.

15. The electronic device of claim 7, wherein the first coil and the second coil are wound with different numbers of turns.

16. The electronic device of claim 7, further comprising:

a first power transmission circuit electrically coupled to the first coil; and a second power transmission circuit electrically coupled to the second coil, wherein the second power transmission circuit further comprises an inductance element electrically coupled to the second coil.

17. The electronic device of claim 16, wherein the inductance element comprises a lumped inductor.

18. The electronic device of claim 16, further comprising:

a current blocking circuit electrically coupled to a power input terminal of at least one of the first power transmission circuit or the second power transmission circuit.

19. The electronic device of claim 18, wherein the current blocking circuit comprises a set of transistors for blocking a path of current.

20. A method of operating an electronic device comprising a housing including a concave portion, a first coil disposed at a first height to transmit power for a first external device, and a second coil disposed coaxially with the first coil at a second height which is higher than the first height to transmit power for a second external device, wherein the first coil and the second coil are stored inside the housing, wherein the first coil and the second coil are located corresponding to the concave portion and the second coil is closer to the concave portion than the first coil, the method comprising:

outputting a signal for detecting the first external device or the second external device; and transmitting power through a corresponding coil out of the first coil or the second coil with respect to the detected first external electronic device or the detected second external electronic device, wherein the transmitting of the power blocks leakage current induced to a remaining coil from being introduced to a power input terminal due to a coil, which transmits power, out of the first coil or the second coil.

\* \* \* \* \*